(12) United States Patent
Bailey

(10) Patent No.: US 7,274,746 B2
(45) Date of Patent: Sep. 25, 2007

(54) SYSTEM AND METHOD FOR MITIGATING NOISE ASSOCIATED WITH INFORMATION COMMUNICATION

(75) Inventor: George R. Bailey, Gaithersburg, MD (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 691 days.

(21) Appl. No.: 10/743,801

(22) Filed: Dec. 24, 2003

(65) Prior Publication Data

US 2005/0143008 A1    Jun. 30, 2005

(51) Int. Cl.
*H04B 15/00* (2006.01)
(52) U.S. Cl. ...................................... 375/285
(58) Field of Classification Search ................ 375/219, 375/220, 222, 359, 378, 384, 385; 323/318, 323/371; 327/143, 535; 455/572, 573, 570; 714/14, 22
See application file for complete search history.

(56) References Cited

U.S. PATENT DOCUMENTS

| | | | |
|---|---|---|---|
| 5,324,994 A | | 6/1994 | Sullivan et al. |
| 5,987,392 A | | 11/1999 | Tucker et al. |
| 6,055,440 A | * | 4/2000 | Masahiro .................. 455/556.1 |
| 6,084,439 A | * | 7/2000 | Sculley ......................... 327/59 |
| 6,115,588 A | * | 9/2000 | Nasuda ........................ 455/228 |
| 6,342,849 B1 | | 1/2002 | Fujiwara |
| 6,472,861 B2 | | 10/2002 | Chen et al. |
| 6,535,027 B1 | | 3/2003 | Ziermann |
| 2001/0004375 A1 | * | 6/2001 | Partyka ....................... 375/135 |

* cited by examiner

*Primary Examiner*—Khanh Tran
*Assistant Examiner*—Sam Ahn
(74) *Attorney, Agent, or Firm*—Gilberto M. Villacorta; Phillip J. Articola; Foley & Lardner LLP

(57) ABSTRACT

A system for mitigating noise associated with information communication includes means for determining when a first set of information is transmitted by a transmitter. The system includes a receiver for receiving a second set of information in response to the first set of information. The system also includes control means for temporarily suspending at least one process when the determining means determines that the first set of information is being transmitted and for continuing the at least one process after the second set of information has been received by the receiver. The at least one process produces noise that interferes with an integrity of the second set of information received by the receiver.

32 Claims, 6 Drawing Sheets

SYSTEM AND METHOD FOR MITIGATING NOISE ASSOCIATED WITH INFORMATION COMMUNICATION

BACKGROUND

1. Field of the Invention

The present invention relates to information communication systems. More particularly, the present invention relates to a system and method for mitigating noise associated with information communication.

2. Background Information

A conventional time domain reflectometer (TDR) operates by abruptly stimulating an object under test, and subsequently, over time, recording the elicited responses. Typically, the subject object is a medium designed for the propagation of energy from point to point in some form, such as, for example, sound, light or electricity. One type of TDR can analyze the electrical propagation characteristics of extended lengths of twisted pairs of wires, as are commonly used to transport telecommunications signals. Such a TDR is designed to interface with twisted pair wire lines that are deployed as a subscriber loop plant (the collective set of the pair of leads over which each subscriber has traditionally been provided fixed location telephone service) at either the service provider's, or subscriber's, end.

In operation, such a TDR emits a probe signal of an appropriate kind for the subject telecommunications medium. Non-uniformities in the telecommunications medium exist, and probe signal energy is lost progressively as a function of distance traveled in the medium, due to the unavoidable dissipative characteristics of the medium material. Any non-uniformity encountered as the probe signal stimulus propagates along the medium results in at least a partial reversal of probe signal energy flow, thus producing a return, or echo, signal that propagates back toward the stimulus source. These echoes, or reflections, are essentially returning signatures of aberrations in an otherwise continuous and uniform telecommunications transmission medium. The TDR records echoes, if any, from the moment of probe signal emission, as a function of time as the echoes arrive back at the source. Recording these echoes with respect to time provides a signature of the medium that reveals non-uniformities created either intentionally, or by accident, along the propagation path. In addition, the distance from the observation point to any particular aberration can be imputed from the corresponding return delay time relative to the probe signal stimulus, if the propagation speed for the medium is known.

This type of measurement has been unnecessary for subscriber loops until the recent deployment of wide-bandwidth digital services over wire line facilities originally intended only for narrow-bandwidth voice and modem signal transport. Now, defects that were previously inconsequential for the purposes of analog voice service can impair or even inhibit operation of, for example, xDSL (where "xDSL" refers to any variant of the Digital Subscriber Loop (DSL) technologies for transmitting high-bandwidth information over twisted-pair (i.e., copper wire) wire lines). A TDR provides a convenient means of identifying the type of, and distance to, a particular discontinuity or defect.

xDSL services can be offered over loop lengths as long as 18,000 feet from the telephone company office, without a repeater. At these lengths, energy losses at the frequencies necessary for xDSL operation can be so large that only approximately 1 part in 10,000 of the energy provided by the service provider ultimately appears at the subscriber end of the loop. It follows, then, that a defect near the subscriber, or far end of the loop, that will produce a reflection of a similarly attenuated incident TDR probe signal, can only be identified after traveling back to the TDR, again suffering the same ratio of energy reduction. Thus, a TDR must be able to identify energy as a probe signal echo that may be only 1 part in 100,000,000 as big as the issued probe signal. Since the probe signal cannot be made arbitrarily large, for both practical and regulatory reasons, much of the small signal recovery burden falls on the TDR receiver.

Receiver sensitivity is fundamentally limited by noise (i.e., unwanted electrical or electromagnetic energy that degrades the quality of signals and data) that can be created not only externally, but also within the receiver itself. Ideally, the contribution by the receiver, or the other portions of the apparatus containing the receiver, should be zero. For TDR, for example, since for practical purposes the state of the loop being probed is unchanging, or stationary, the probe signal can be sent numerous times, as long as enough time elapses between trials to allow all of the reverberating energy to dissipate. For incoherent noise (i.e., noise that is unrelated in periodicity to the receiver process or probe signal), a common mitigation method involves averaging the results from N trials which reduces the apparent noise energy by N. Unfortunately, this same process is not effective in mitigating coherent noise (i.e., noise that is related in periodicity to the receiver process or probe signal).

Conventional solutions for mitigating induced receiver noise can involve identifying the offending noise sources individually, and addressing, in turn, each of the dominant coupling mechanisms to the receiver. For example, if a switching power converter circuit is a noise producer, the receiver can be affected by conducted interference created by the switching operation itself or a poor transient response to a periodically changing load. Mitigation of the effects of this noise can involve, for example, adding filtering to further isolate the receiver from the vagaries of the switching power converter, correcting the transient response, or altering the load characteristics imposed on the switching power converter. Each of these mitigation measures can require design changes that can increase circuit board design complexity, and which can result in cumbersome and costly circuit board alterations. Furthermore, radiated electromagnetic fields from a switching power converter can play a role in disturbing a proximal receiver. This coupling mechanism can be mitigated by increasing the physical distance between the noise producer and the victim circuitry. If increasing physical distance is impractical as a result of, for example, circuit board size constraints, shielding can be added around specific components or entire blocks of circuit components of either or both of the involved circuits. Again, circuit board and mechanical design complexity increases with attendant size and cost penalties.

SUMMARY OF THE INVENTION

A system and method are disclosed for mitigating noise associated with information communication. In accordance with exemplary embodiments of the present invention, according to a first aspect of the present invention, a system for mitigating noise associated with information communication includes means for determining when a first set of information is transmitted by a transmitter. The system includes a receiver for receiving a second set of information in response to the first set of information. The system includes control means for temporarily suspending at least one process when the determining means determines that the first set of information is being transmitted and for continuing the at least one process after the second set of information has been received by the receiver. The at least one process produces noise that interferes with an integrity of the second set of information received by the receiver.

According to an embodiment of the first aspect, the at least one process can be associated with receiver noise. The receiver can receive the second set of information while the at least one process associated with receiver noise is temporarily suspended. The at least one process associated with receiver noise can comprise a supply of power to the receiver. The system can include means for storing energy to power the receiver when the supply of power to the receiver is temporarily suspended. The transmitter can transmit the first set of information. The at least one process can be associated with transmitter noise. The control means can temporarily suspend the at least one process associated with transmitter noise when the determining means determines that the first set of information is to be transmitted and can continue the at least one process associated with transmitter noise after the first set of information has been transmitted by the transmitter. The at least one process associated with transmitter noise can produce noise that interferes with an integrity of the first set of information transmitted by the transmitter. The transmitter can transmit the first set of information while the at least one process associated with transmitter noise is temporarily suspended. The at least one process associated with transmitter noise can comprise a supply of power to the transmitter. The system can include means for storing energy to power the transmitter when the supply of power to the transmitter is temporarily suspended.

According to the first aspect, the receiver can receive at least one of a plurality of subsets of information. The plurality of subsets of information can comprise the second set of information. The received plurality of subsets of information can be combined to form the second set of information. The receiver can receive the second set of information between peak intervals in noise of at least one other process. The at least one other process can have an absence of association with the receiver. Peaks in the noise of the at least one other process can occur at determined intervals. The system can include means for determining peak intervals in noise of at least one other process. The at least one other process can have an absence of association with at least one of the transmitter and the receiver. Peaks in the noise of the at least one other process can occur at determined intervals. The receiver can receive the second set of information between the peak intervals in the noise of the at least one other process. The transmitter can transmit the first set of information at a determined time such that the second set of information is received by the receiver between the peak intervals in the noise of the at least one other process. The system can include means for processing information associated with at least one of the transmitter and the receiver. The processing means can process the second set of information after the second set of information has been received by the receiver. The system can include means for storing the information associated with at least one of the transmitter and the receiver. The information associated with at least one of the transmitter and the receiver can be retrieved from the means for storing information while at least one process associated with at least one of transmitter noise and receiver noise is temporarily suspended.

According to a second aspect of the present invention, a method of mitigating noise associated with information communication comprises the steps of: i.) determining when a first set of information is transmitted by a transmitter, wherein a second set of information is received by a receiver in response to the first set of information; ii.) temporarily suspending at least one process when it is determined that the first set of information is being transmitted, wherein the at least one process produces noise that interferes with an integrity of the second set of information received by the receiver; and iii.) continuing the at least one process after the second set of information has been received by the receiver.

According to an embodiment of the second aspect, the at least one process can be associated with receiver noise. The method can comprise the step of: iv.) receiving the second set of information by the receiver while the at least one process associated with receiver noise is temporarily suspended. The at least one process associated with receiver noise can comprise a supply of power to the receiver. The method can comprise the step of: v.) storing energy to power the receiver when the supply of power to the receiver is temporarily suspended. The method can comprise the step of: vi.) transmitting the first set of information by the transmitter. The at least one process can be associated with transmitter noise. The method can comprise the steps of: vii.) temporarily suspending the at least one process associated with transmitter noise when it is determined that the first set of information is to be transmitted, wherein the at least one process associated with transmitter noise produces noise that interferes with an integrity of the first set of information transmitted by the transmitter; and viii.) continuing the at least one process associated with transmitter noise after the first set of information has been transmitted by the transmitter. The method can comprise the step of: ix.) transmitting the first set of information by the transmitter while the at least one process associated with transmitter noise is temporarily suspended. The at least one process associated with transmitter noise can comprise a supply of power to the transmitter. The method can comprise the step of: x.) storing energy to power the transmitter when the supply of power to the transmitter is temporarily suspended.

According to the second aspect, the method can comprise the steps of: xi.) receiving at least one of a plurality of subsets of information, wherein the plurality of subsets of information comprise the second set of information; and xii.) combining the received plurality of subsets of information to form the second set of information. The method can comprise the steps of: xiii.) receiving the second set of information by the receiver between peak intervals in noise of at least one other process, wherein the at least one other process has an absence of association with at least one of the transmitter and the receiver, and wherein peaks in the noise of the at least one other process occur at determined intervals. The method can comprise the steps of: xiv.) determining peak intervals in noise of at least one other process, wherein the at least one other process has an absence of association with the receiver, wherein peaks in the noise of the at least one other process occur at determined intervals; and xv.) receiving the second set of information by the receiver between the peak intervals in the noise of the at least one other process. The transmitter can transmit the first set of information at a determined time such that the second set of information is received by the receiver between the peak intervals in the noise of the at least one other process. The method can comprise the steps of: xvi.) processing information associated with at least one of the transmitter and the receiver; xvii.) processing the second set of information after the second set of information has been received by the receiver; xviii.) storing the information associated with at least one of the transmitter and the receiver; and xix.)

retrieving from information storage the information associated with at least one of the transmitter and the receiver while at least one process associated with at least one of transmitter noise and receiver noise is temporarily suspended.

According to a third aspect of the present invention, a computer-readable medium contains a computer program for mitigating noise associated with information communication. The computer program performs the steps of: i.) determining when a first set of information is transmitted by a transmitter, wherein a second set of information is received by a receiver in response to the first set of information; ii.) temporarily suspending at least one process when it is determined that the first set of information is being transmitted, wherein the at least one process produces noise that interferes with an integrity of the second set of information received by the receiver; and iii.) continuing the at least one process after the second set of information has been received by the receiver.

According to an embodiment of the third aspect, the at least one process can be associated with receiver noise. The computer program can perform the step of: iv.) controlling the receiver to receive the second set of information while the at least one process associated with receiver noise is temporarily suspended. The at least one process associated with receiver noise can comprise a supply of power to the receiver. The computer program perform the step of: v.) controlling a storage of energy to power the receiver when the supply of power to the receiver is temporarily suspended. The computer program can perform the step of: vi.) controlling the transmitter to transmit the first set of information. The at least one process can be associated with transmitter noise. The computer program can perform the steps of: vii.) temporarily suspending the at least one process associated with transmitter noise when it is determined that the first set of information is to be transmitted, wherein the at least one process associated with transmitter noise produces noise that interferes with an integrity of the first set of information transmitted by the transmitter; and viii.) continuing the at least one process associated with transmitter noise after the first set of information has been transmitted by the transmitter. The computer program can perform the step of: ix.) controlling the transmitter to transmit the first set of information while the at least one process associated with transmitter noise is temporarily suspended. The at least one process associated with transmitter noise can comprise a supply of power to the transmitter. The computer program can perform the step of: x.) controlling a storage of energy to power the transmitter when the supply of power to the transmitter is temporarily suspended.

According to the third aspect, the receiver can receive at least one of a plurality of subsets of information. The plurality of subsets of information can comprise the second set of information. The received plurality of subsets of information can be combined to form the second set of information. The receiver can receive the second set of information between peak intervals in noise of at least one other process. The at least one other process can have an absence of association with at least one of the transmitter and the receiver. Peaks in the noise of the at least one other process can occur at determined intervals. The computer program can perform the step of: xi.) determining peak intervals in noise of at least one other process, wherein the at least one other process has an absence of association with at least one of the transmitter and the receiver, wherein peaks in the noise of the at least one other process occur at determined intervals, and wherein the receiver receives the second set of information between the peak intervals in the noise of the at least one other process. The transmitter can transmit the first set of information at a determined time such that the second set of information is received by the receiver between the peak intervals in the noise of the at least one other process. The computer program can perform the steps of: xii.) processing information associated with at least one of the transmitter and the receiver; xiii.) processing the second set of information after the second set of information has been received by the receiver; xiv.) storing the information associated with at least one of the transmitter and the receiver; and xv.) retrieving from information storage the information associated with at least one of the transmitter and the receiver while at least one process associated with at least one of transmitter noise and receiver noise is temporarily suspended.

According to a fourth aspect of the present invention, a system for mitigating noise associated with information communication includes a transmitter for transmitting a first set of information. A second set of information is received by a receiver in response to the first set of information. The system includes means for determining when the first set of information is transmitted by the transmitter. The system includes control means for temporarily suspending at least one process when the determining means determines that the first set of information is being transmitted and for continuing the at least one process after a first set of information has been transmitted by the transmitter. The at least one process produces noise that interferes with an integrity of the first set of information transmitted by the transmitter.

According to an embodiment of the fourth aspect, the at least one process can be associated with transmitter noise. The transmitter can transmit the first set of information while the at least one process associated with transmitter noise is temporarily suspended. The at least one process associated with transmitter noise can comprise a supply of power to the transmitter. The system can include means for storing energy to power the transmitter when the supply of power to the transmitter is temporarily suspended. The receiver can receive the second set of information. The at least one process can be associated with the receiver. The control means can temporarily suspend the at least one process associated with receiver noise when the determining means determines that the first set of information is being transmitted and continue the at least one process associated with receiver noise after the second set of information has been received by the receiver. The at least one process associated with receiver noise can produce noise that interferes with an integrity of the second set of information received by the receiver. The receiver can receive the second set of information while the at least one process associated with receiver noise is temporarily suspended. The at least one process associated with receiver noise can comprise a supply of power to the receiver. The system can include means for storing energy to power the receiver when the supply of power to the receiver is temporarily suspended.

According to the fourth aspect, the receiver can receive at least one of a plurality of subsets of information. The plurality of subsets of information can comprise the second set of information. The received plurality of subsets of information can be combined to form the second set of information. The receiver can receive the second set of information between peak intervals in noise of at least one other process. The at least one other process can have an absence of association with at least one of the transmitter and the receiver. Peaks in the noise of the at least one other process can occur at determined intervals. The system can include means for determining peak intervals in noise of at least one other process. The at least one other process can have an absence of association with at least one of the transmitter and the receiver. Peaks in the noise of the at least one other process can occur at determined intervals. The receiver can receive the second set of information between the peak intervals in the noise of the at least one other process. The transmitter can transmit the first set of information at a determined time such that the second set of information is received by the receiver between the peak intervals in the noise of the at least one other process. The system can include means for processing information associated with at least one of the transmitter and the receiver. The processing means can process the second set of information after the second set of information has been received by the receiver. The system can include means for storing the information associated with at least one of the transmitter and the receiver. The information associated with at least one of the transmitter and the receiver can be retrieved from information storage while at least one process associated with at least one of transmitter noise and receiver noise is temporarily suspended.

According to a fifth aspect of the present invention, a method of mitigating noise associated with information communication comprises the steps of: i.) determining when a first set of information is transmitted by a transmitter, wherein a second set of information is received by a receiver in response to the first set of information; ii.) temporarily suspending at least one process when it is determined that the first set of information is being transmitted; and iii.) continuing the at least one process after the first set of information has been transmitted by the transmitter, wherein the at least one process produces noise that interferes with an integrity of the first set of information transmitted by the transmitter.

According to an embodiment of the fifth aspect, the at least one process can be associated with transmitter noise. The method can comprise the step of: iv.) transmitting the first set of information by the transmitter while the at least one process associated with transmitter noise is temporarily suspended. The at least one process associated with transmitter noise can comprise a supply of power to the transmitter. The method can comprise the step of: v.) storing energy to power the transmitter when the supply of power to the transmitter is temporarily suspended. The method can comprise the step of: vi.) receiving the second set of information by the receiver. The at least one process can be associated with receiver noise. The method can comprise the steps of: vii.) temporarily suspending the at least one process associated with receiver noise when it is determined that the first set of information is being transmitted, wherein the at least one process associated with receiver noise produces noise that interferes with an integrity of the second set of information received by the receiver; and viii.) continuing the at least one process associated with receiver noise after the second set of information has been received by the receiver. The method can comprise the step of: ix.) receiving the second set of information by the receiver while the at least one process associated with receiver noise is temporarily suspended. The at least one process associated with receiver noise can comprise a supply of power to the receiver. The method can comprise the step of: x.) storing energy to power the receiver when the supply of power to the receiver is temporarily suspended.

According to the fifth aspect, the method can comprise the steps of: xi.) receiving at least one of a plurality of subsets of information, wherein the plurality of subsets of information comprise the second set of information; and xii.) combining the received plurality of subsets of information to form the second set of information. The method can comprise the step of: xiii.) receiving the second set of information by the receiver between peak intervals in noise of at least one other process, wherein the at least one other process has an absence of association with at least one of the transmitter and the receiver, and wherein peaks in the noise of the at least one other process occur at determined intervals. The method can comprise the steps of: xiv.) determining peak intervals in noise of at least one other process, wherein the at least one other process has an absence of association with at least one of the transmitter and the receiver, wherein peaks in the noise of the at least one other process occur at determined intervals; and xv.) receiving the second set of information by the receiver between the peak intervals in the noise of the at least one other process. The transmitter can transmit the first set of information at a determined time such that the second set of information is received by the receiver between the peak intervals in the noise of the at least one other process. The method can comprise the steps of: xvi.) processing information associated with at least one of the transmitter and the receiver; xvii.) processing the second set of information after the second set of information has been received by the receiver; xviii.) storing the information associated with at least one of the transmitter and the receiver; and xix.) retrieving from information storage the information associated with at least one of the transmitter and the receiver while at least one process associated with at least one of transmitter noise and receiver noise is temporarily suspended.

According to a sixth aspect of the present invention, a computer-readable medium contains a computer program for mitigating noise associated with information communication. The computer program performs the steps of: i.) determining when a first set of information is transmitted by a transmitter, wherein a second set of information is received by a receiver in response to the first set of information; ii.) temporarily suspending at least one process when it is determined that the first set of information is being transmitted; and iii.) continuing the at least one process after the first set of information has been transmitted by the transmitter, wherein the at least one process produces noise that interferes with an integrity of the first set of information transmitted by the transmitter.

According to an embodiment of the sixth aspect, the at least one process can be associated with transmitter noise. The computer program can perform the step of: iv.) controlling the transmitter to transmit the first set of information while the at least one process associated with transmitter noise is temporarily suspended. The at least one process associated with transmitter noise can comprise a supply of power to the transmitter. The computer program can perform the step of: v.) controlling a storage of energy to power the transmitter when the supply of power to the transmitter is temporarily suspended. The computer program can perform the step of: vi.) controlling the receiver to receive the second set of information. The at least one process can be associated with receiver noise. The computer program can perform the steps of: vii.) temporarily suspending the at least one process associated with receiver noise when it is determined that the first set of information is being transmitted, wherein the at least one process associated with receiver noise produces noise that interferes with an integrity of the second set of information received by the receiver; and viii.) continuing the at least one process associated with receiver noise after the second set of information has been received by the receiver. The computer program can perform the step of: ix.) controlling the receiver to receive the second set of information while the at least one process associated with receiver noise is temporarily suspended. The at least one process associated with receiver noise can comprise a supply of power to the receiver. The computer program can perform the step of: x.) controlling a storage of energy to power the receiver when the supply of power to the receiver is temporarily suspended.

According to the sixth aspect, the receiver can receive at least one of a plurality of subsets of information. The plurality of subsets of information can comprise the second set of information. The received plurality of subsets of information can be combined to form the second set of information. The receiver can receive the second set of information between peak intervals in noise of at least one other process. The at least one other process can have an absence of association with at least one of the transmitter and the receiver. Peaks in the noise of the at least one other process can occur at determined intervals. The computer program can perform the step of: xi.) determining peak intervals in noise of at least one other process, wherein the at least one other process has an absence of association with at least one of the transmitter and the receiver, wherein peaks in the noise of the at least one other process occur at determined intervals, and wherein the receiver receives the second set of information between the peak intervals in the noise of the at least one other process. The transmitter can transmit the first set of information at a determined time such that the second set of information is received by the receiver between the peak intervals in the noise of the at least one other process. The computer program can perform the steps of: xii.) processing information associated with at least one of the transmitter and the receiver; xiii.) processing the second set of information after the second set of information has been received by the receiver; xiv.) storing the information associated with at least one of the transmitter and the receiver; and xv.) retrieving from information storage the information associated with at least one of the transmitter and the receiver while at least one process associated with at least one of transmitter noise and receiver noise is temporarily suspended.

According to a seventh aspect of the present invention, a system for mitigating noise associated with information communication includes means for determining when a set of information is communicated. The system includes control means for temporarily suspending at least one process when the determining means determines that the set of information is being communicated, and for continuing the at least one process after the set of information has been communicated. The at least one process associated with the communication produces noise that interferes with an integrity of the set of information. The set of information is communicated while the at least one process is temporarily suspended.

According to an embodiment of the seventh aspect, the set of information can include a first set of information for transmission by a transmitter. The at least one process can be associated with transmitter noise. The control means can temporarily suspend the at least one process associated with transmitter noise when the determining means determines that the first set of information is to be transmitted and continue the at least one process associated with transmitter noise after the first set of information has been transmitted by the transmitter. The at least one process associated with transmitter noise can produce noise that interferes with an integrity of the first set of information transmitted by the transmitter. The transmitter can transmit the first set of information while the at least one process associated with transmitter noise is temporarily suspended. The at least one process associated with transmitter noise can comprise a supply of power to the transmitter. The system can include means for storing energy to power the transmitter when the supply of power to the transmitter is temporarily suspended.

According to the seventh aspect, the set of information can include a first set of information and a second set of information. The second set of information can be received by a receiver in response to transmission of the first set of information. The at least one process can be associated with receiver noise. The control means can temporarily suspend the at least one process associated with receiver noise when the determining means determines that the first set of information is being transmitted and continue the at least one process associated with receiver noise after the second set of information has been received by the receiver. The at least one process associated with receiver noise can produce noise that interferes with an integrity of the second set of information received by the receiver. The receiver can receive the second set of information while the at least one process associated with receiver noise is temporarily suspended. The at least one process associated with receiver noise can comprise a supply of power to the receiver. The system can include means for storing energy to power the receiver when the supply of power to the receiver is temporarily suspended.

According to the seventh aspect, the receiver can receive at least one of a plurality of subsets of information. The plurality of subsets of information can comprise the second set of information. The received plurality of subsets of information can be combined to form the second set of information. The receiver can receive the second set of information between peak intervals in noise of at least one other process. The at least one other process can have an absence of association with at least one of the transmitter and the receiver. Peaks in the noise of the at least one other process can occur at determined intervals. The system can include means for determining peak intervals in noise of at least one other process. The at least one other process can have an absence of association with at least one of the transmitter and the receiver. Peaks in the noise of the at least one other process can occur at determined intervals. The receiver can receive the second set of information between the peak intervals in the noise of the at least one other process. The transmitter can transmit the first set of information at a determined time such that the second set of information is received by the receiver between the peak intervals in the noise of the at least one other process. The system can include means for processing information associated with the communication of the set of information. The system can include means for storing information associated with the communication of the set of information. The information associated with the communication of the set of information can be retrieved from information storage while at least one process associated with communication noise is temporarily suspended.

According to an eighth aspect of the present invention, a method for mitigating noise associated with information communication comprises the steps of: i.) determining when a set of information is communicated; ii.) temporarily suspending at least one process when it is determined that the set of information is being communicated, wherein the at least one process produces noise that interferes with an integrity of the set of information; iii.) communicating the set of information while the at least one process is temporarily suspended; and iv.) continuing the at least one process after the set of information has been communicated.

According to an embodiment of the eight aspect, the set of information can include a first set of information for transmission by a transmitter. The at least one process can be associated with transmitter noise. The method can comprise the steps of: v.) temporarily suspending the at least one process associated with transmitter noise when it is determined that the first set of information is to be transmitted, wherein the at least one process associated with transmitter noise produces noise that interferes with an integrity of the first set of information transmitted by the transmitter; and vi.) continuing the at least one process associated with transmitter noise after the first set of information has been transmitted by the transmitter. The method can comprise the step of: vii.) transmitting the first set of information by the transmitter while the at least one process associated with transmitter noise is temporarily suspended. The at least one process associated with transmitter noise can comprise a supply of power to the transmitter. The method can comprise the step of: viii.) storing energy to power the transmitter when the supply of power to the transmitter is temporarily suspended.

According to the eighth aspect, the set of information can include a first set of information and a second set of information. The second set of information can be received by a receiver in response to transmission of the first set of information. The at least one process can be associated with receiver noise. The method can comprise the steps of: ix.) temporarily suspending the at least one process associated with receiver noise when it is determined that the first set of information is being transmitted, wherein the at least one process associated with receiver noise produces noise that interferes with an integrity of the second set of information received by the receiver; and x.) continuing the at least one process associated with receiver noise after the second set of information has been received by the receiver. The method can comprise the steps of: xi.) receiving the second set of information while the at least one process associated with receiver noise is temporarily suspended. The at least one process associated with receiver noise can comprise a supply of power to the receiver. The method can comprise the step of: xii.) storing energy to power the receiver when the supply of power to the receiver is temporarily suspended.

According to the eighth aspect, the method can comprise the steps of: xiii.) receiving at least one of a plurality of subsets of information, wherein the plurality of subsets of information comprise the second set of information; and xiv.) combining the received plurality of subsets of information to form the second set of information. The method can comprise the steps of: xv.) receiving the second set of information between peak intervals in noise of at least one other process, wherein the at least one other process has an absence of association with at least one of the transmitter and the receiver, and wherein peaks in the noise of the at least one other process occur at determined intervals. The method can comprise the steps of: xvi.) determining peak intervals in noise of at least one other process, wherein the at least one other process has an absence of association with at least one of the transmitter and the receiver, wherein peaks in the noise of the at least one other process occur at determined intervals; and xvii.) receiving the second set of information between the peak intervals in the noise of the at least one other process. The transmitter can transmit the first set of information at a determined time such that the second set of information is received by the receiver between the peak intervals in the noise of the at least one other process.

The method can comprise the steps of: xviii.) processing information associated with the communication of the set of information; xix.) storing information associated with the communication of the set of information; and xx.) retrieving from information storage the information associated with the communication of the set of information while at least one process associated with communication noise is temporarily suspended.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
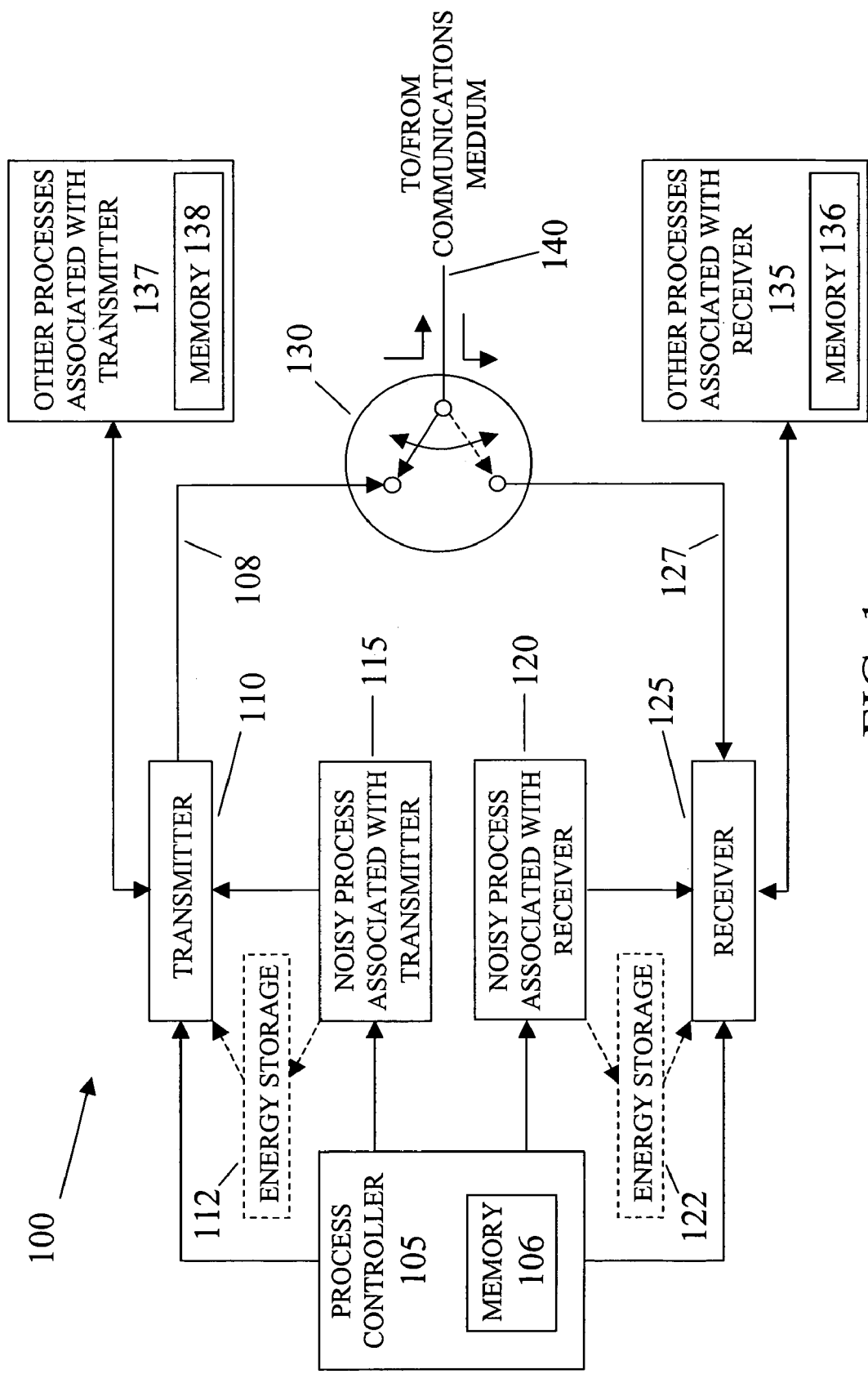
FIG. 1 is a block diagram illustrating a system for mitigating noise associated with information communication, in accordance with an exemplary embodiment of the present invention.

A system and method are disclosed for mitigating noise associated with information communication. In accordance with an exemplary embodiment of the present invention, in a communication system with any number of interfering controllable noise sources, the operation of those noise processes that contribute to the effective communication system noise level can be temporarily suspended during the time of actual transmission and/or reception of information by the communication system. In other words, according to exemplary embodiments, controllable noise processes not instantly associated with transmission and/or reception operation of the communication system can be temporarily suspended or otherwise interrupted during the actual transmission and/or reception of data, without the need to mitigate the coupling mechanisms to the otherwise disruptive noise sources.

For example, given a receiver that collects data over multiple sampling intervals, during the time the receiver is collecting samples, the controllable noisy process(es) that can affect the receiver and signal reception can be temporarily suspended. The receiver can then collect the samples without interference from the noisy process(es) that would otherwise affect the integrity of the received signal. Again, by example, for a transmitter, during the time the transmitter is transmitting data, the noisy process(es) that can affect the transmitter and signal transmission can be temporarily suspended. The transmitter can then transmit the data without interference from the controllable noisy process(es) that would otherwise affect the integrity of the transmitted signal.

For uncontrollable noise sources that are unrelated to the transmitter and/or receiver, however, if the noise is comprised of bursts of transient noise that occur at regular intervals, the receiver can be synchronized to the periodicity of the noise such that information can be received between the following anticipated bursts of the noise. According to an alternative exemplary embodiment, the noise effects can be mitigated by shifting the receive window to coincide with the interval between the interval of peak noise. Correspondingly, the transmitted information intended for reception must be adjusted in time to insure arrival at the receiver during receive intervals, including any propagation delays. The process of mitigating uncontrollable noise can be used in addition to, or alternatively to, the process for mitigating controllable noise. Thus, exemplary embodiments of the present invention provide techniques for mitigating either or both controllable and uncontrollable noise associated with information communication.

As used herein, a "controllable" noise process is a process that can be launched, terminated or otherwise influenced, under the control of the same entity or entities that orchestrate the operation of the communication system. Conversely, an "uncontrollable" noise process is a process that affect, generally unintentionally and to the potential detriment of, the action of communication, over which the entity or entities orchestrating the operation of the communicating devices can have no influence.

These and other aspects of the present invention will now be described in greater detail. FIG. 1 is a block diagram illustrating a system 100 for mitigating noise associated with information communication, in accordance with an exemplary embodiment of the present invention.

The system 100 can include means for determining when a first set of information is transmitted by a transmitter 110. Any means for determining when a first set of information is transmitted can be used. For example, a process controller 105 can be used to determine when a first set of information is transmitted by the transmitter 110. The process controller 105 can be any type of processor, such as, for example, any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like. However, the means for determining can be implemented using any combination of hardware, software, and/or firmware.

The process controller 105 can include, for example, a memory 106 that can be any type of computer memory or any other type of electronic storage medium that is located either internally or externally to process controller 105, such as, for example, read-only memory (ROM), random access memory (RAM), cache memory, compact disc read-only memory (CDROM), electro-optical memory, magneto-optical memory, or the like. As will be appreciated based on the following description, the memory 106 of process controller 105 can, for example, be programmed using conventional techniques known to those having ordinary skill in the art of computer programming. The actual source code or object code of a computer program for determining when a first set of information is transmitted by the transmitter 110, or for performing any or all of the functions described herein for process controller 105, can be stored in the memory 106.

To determine when the first set of information is transmitted by the transmitter 110, the process controller 105 can, for example, control the timing of the transmission of signals by the transmitter 110. Alternatively, the process controller 105 can detect when a signal is transmitted by transmitter 110, for example, by detecting a non-zero output voltage on the output of transmitter 110. However, other methods can be used by process controller 105 to detect when the first set of information is transmitted by transmitter 110. In addition, determining means other than process controller 105 can be used for determining when the first set of information is transmitted by transmitter 110 (e.g., a voltage or signal detector connected to the output of transmitter 110 to detect when a signal is transmitted, and the like).

The transmitter 110 can be any type of electronic component or device that is capable of transmitting information over a communications medium, such as communications medium 140. For example, transmitter 110 can be any type of signal generation device, such as, for example, a stimulus pulse generator, for generating a signal to be transmitted over the communications medium 140. Alternatively, transmitter 110 can be any type of signal modulator for modulating a signal for transmission over the communications medium 140. However, transmitter 110 can be any type of transmission device for transmitting information over the communications medium 140. According to exemplary embodiments, the transmitter 110 can transmit the first set of information. The first set of information transmitted by transmitter 110 can be any type of information that can be transmitted over the communications medium 140, such as, for example, an electrical or electromagnetic signal, an optical signal, an acoustic signal, a stimulus pulse, or any other type of signal or information. The communications medium 140 can be, for example, a twisted pair of wires, as are commonly used to transport telecommunications signals. The communications medium 140 can be, however, any type of communications medium over which the first set of information can be transmitted and received, such as, for example, a wire or other electrical cable, a fiber optic cable, an acoustic medium, a medium for propagating electromagnetic waves, or the like.

According to exemplary embodiments, when the determining means, such as, for example, process controller 105, determines that the first set of information has been transmitted by transmitter 110, the process controller 105 can control, for example, a switch 130 connected to the communications medium 140 to switch between a transmission line 108 and a receiving line 127 of the system 100. The switch 130 can be any type of electronic switch that can be used for switchably connecting the communications medium 140 to one of any number of other communications lines within system 100. For example, the switch 130 can be initially configured such that the transmission line 108 is connected to the communications medium 140. When process controller 105 detects that, for example, a stimulus pulse has been transmitted by transmitter 110, the process controller 105 can control switch 130 to switch the connection to the communications medium 140 from the transmission line 108 to the receiver line 127 so that an impulse response signal can be received accordingly. However, direct connections between the communications medium 140 and the transmission and receiver lines 108 and 127, respectively, can be made instead of the switchable connections using switch 130.

The system 100 can also include a receiver 125 for receiving a second set of information in response to the first set of information. The receiver 125 can be any type of electronic component or device that is capable of receiving information over the communications medium 140. For example, receiver 125 can be any type of signal reception device, such as, for example, a sampled data receiver, for sampling data received over the communications medium 140. However, receiver 125 can be any type of receiver device for receiving information over the communications medium 140. The second set of information received by receiver 125 can be any type of information that can be received over the communications medium 140, such as, for example, an electrical or electromagnetic signal, an optical signal, an acoustic signal, a stimulus pulse, or any other type of signal or information. According to exemplary embodiments, the second set of information can be received in response to the first set of information. For example, if the first set of information is a stimulus pulse signal, the second set of information can be a stimulus response signal, such as, for example, an echo or reflection from the communications medium 140, or any other type of response signal to a stimulus signal. However, the second set of information can be any type of signal or information that can be received over the communications medium 140.

The system 100 can include control means for temporarily suspending at least one process when the determining means determines that the first set of information is being transmitted, and for continuing the at least one process after the second set of information has been received by the receiver 125. Any control means for temporarily suspending and for continuing noisy process(es) can be used. For example, process controller 105 can be used to temporarily suspend the noisy process(es) when the process controller 105 determines that the first set of information is being transmitted and to continue the noisy process(es) after the second set of information has been received. However, the control means can be implemented using any combination of hardware, software, and/or firmware. For example, although, for purposes of illustration and not limitation, process controller 105 has been described as embodying both the means for determining and the control means, the control means can be embodied separately from the means for determining, such as, for example, in a separate processor that can communicate with process controller 105.

The at least one process can produce noise that interferes with the integrity of the second set of information received by the receiver 125. According to an exemplary embodiment, the at least one process can be associated with receiver 125 noise. For example, noisy process 120 associated with receiver 125 noise can be any type of noisy process or processes that interferes with the integrity of the signal received by the receiver 125. For example, the at least one process can be a process that contributes to the receiver 125 noise, such that there is a cause-and-effect relationship between the process and the receiver 125 noise, such as, for example, communications crosstalk, data manipulation, supply switching transients, and the like. According to exemplary embodiments, the receiver 125 can receive the second set of information while processes not directly associated with the operation of the receiver 125 are temporarily suspended. While the receiver circuitry of receiver 125 and the functions of the receiver 125 used for receiving information can be considered to be directly associated with the operation of the receiver 125, processes such as noisy process 120 are not, and can be temporarily suspended while the receiver 125 receives the second set of information. Thus, the receiver 125 can receive the second set of information while the at least one process associated with receiver 125 noise is temporarily suspended.

According to exemplary embodiments, process controller 105 can determine when transmitter 110 transmits the first set of information. Upon such a determination, process controller 105 can instruct switch 130 to switch from the transmission line 108 to the receiver line 127. Also upon such a determination, process controller 105 can command or otherwise instruct noisy process 120 to temporarily suspend operation. For example, process controller 105 can send a blanking signal or any other type of instruction signal, message or command to noisy process 120 that instructs noisy process 120 to temporarily suspend or otherwise cease operation. Alternatively, process controller 105 can temporarily suspend noisy process 120 by temporarily disconnecting noisy process 120 from receiver 125 using, for example, any type of electronic switch that can connect noisy process 120 to receiver 125. However, any method for temporarily suspending the noisy processes associated with the receiver 125 can be used.

The length of time for which noisy process 120 can be temporarily suspended can depend on the nature and length of the information received by the receiver 125. For example, for short bursts of information, such as, for example, a stimulus pulse response signal received by receiver 125 in response to a stimulus pulse transmitted by transmitter 110, a few milliseconds may be sufficient to receive the information. Thus, the noisy processes associated with the receiver 125 would be suspended for the few milliseconds it takes to receive the information. However, the length of temporary suspension will differ for received information of longer or shorter duration. The length of the suspension can be determined by, for example, process controller 105 by determining when the second set of information has been substantially completely received by the receiver 125, as discussed below.

According to an exemplary embodiment of the present invention, the at least one process associated with receiver 125 noise can comprise a supply of power to the receiver 125. The noisy process 120 can be, for example, a power supply 120 that supplies power to the receiver 125. The power supply 120 of the receiver 125 can then be temporarily suspended while the receiver 125 receives the second set of information. Thus, according to exemplary embodiments, the receiver 125 can receive the second set of information, or any other signal or information, without interference from the associated power supply 120. To power the receiver 125 while the power supply 120 is temporarily suspended, the system 100 can include means for storing energy to power the receiver 125 when the supply of power to the receiver 125 is temporarily suspended. For example, energy storage 122 can be one or more capacitors that store electrical charge supplied from the power supply 120. When the power supply 120 is temporarily suspended, the operating power for receiver 125 can be supplied by, for example, the stored charge in the one or more capacitors of energy storage 122. However, energy storage 122 can be any means for storing energy that can be used to supply power to receiver 125 when the power supply 120 is temporarily suspended, and that does not substantially produce interference or other noise that can affect the integrity of the second set of information.

Once the receiver 125 has received the first set of information, the noisy process 120 can be continued. The control means, such as process controller 105, can determine that the receiver 125 has received the second set of information. For example, process controller 105 can detect that there is no input signal to receiver 125, receiver 125 can supply any type of signal or message to process controller 105 informing process controller 105 that the second set of information has been received, or process controller 105 can use a timer to gauge when the receiver 125 receives the second set of information. However, other methods for detecting when the receiver 125 has received the second set of information can be used.

To continue the noisy process 120 after it has been determined that the receiver 125 has received the second set of information, the control means can command or otherwise instruct noisy process 120 to continue operation. For example, process controller 105 can send an enable signal or any other type of instruction signal, message or command to noisy process 120 that instructs noisy process 120 to continue operation, such as powering up or on. Alternatively, process controller 105 can continue noisy process 120 by connecting noisy process 120 to receiver 125 using, for example, any type of electronic switch that can connect noisy process 120 to receiver 125. The process according to exemplary embodiments of temporarily suspending noisy processes while information is being received and then continuing those noisy processes after the information has been received can be repeated for subsequent sets of information.

According to exemplary embodiments, noisy processes, such as, for example, noisy process 120, can be temporarily suspended while the receiver 125 receives the second set of information, or any other signal or information, to remove the interference contributed by the noisy process 120 that would otherwise affect the integrity of the signal received by the receiver 125. The noisy processes can then be continued after the information has been received. Additionally or alternatively, the at least one process can be associated with transmitter 110 noise, and noisy processes associated with the transmitter 110 noise can be temporarily suspended while the transmitter 110 transmits the first set of information, or any other signal or information, and then continued after the information has been transmitted.

According to exemplary embodiments, the control means can temporarily suspend at least one process associated with transmitter 110 noise when the determining means determines that the first set of information is to be transmitted, and can continue the at least one process associated with transmitter 110 noise after the first set of information has been transmitted by the transmitter 110. According to exemplary embodiments, the at least one process associated with transmitter 110 noise can produce noise that interferes with an integrity of the first set of information transmitted by the transmitter 110. For example, noisy process 115 associated with transmitter 110 can be any type of noisy process or processes that interferes with the integrity of the signal transmitted by the transmitter 110. For example, the at least one process can be a process that contributes to the transmitter 110 noise, such that there is a cause-and-effect relationship between the process and the transmitter 110 noise, such as, for example, communications crosstalk, data manipulation, supply switching transients, and the like.

According to exemplary embodiments, the transmitter 110 can transmit the first set of information while processes not directly associated with the operation of the transmitter 110 are temporarily suspended. Thus, while the transmitter circuitry of transmitter 110 and the functions of the transmitter 110 used for transmitting information can be considered to be directly associated with the operation of the transmitter 110, processes such as noisy process 115 are not, and can be temporarily suspended while the transmitter 110 transmits the first set of information. Thus, according to exemplary embodiments, the transmitter 110 can transmit the first set of information while the at least one process associated with transmitter 110 noise is temporarily suspended.

As discussed previously, any means for determining when a first set of information is transmitted can be used. For example, the process controller 105 can be used to determine when a first set of information is transmitted by the transmitter 110. The process controller 105 can, for example, control the timing of the transmission of signals by the transmitter 110. Alternatively, the process controller 105 can detect when a signal is transmitted by transmitter 110, such as, for example, by detecting a non-zero output voltage on the output of transmitter 110. However, other methods can be used to detect when the first set of information is transmitted by transmitter 110. Additionally, determining means other than process controller 105 can be used for determining when the first set of information is transmitted by transmitter 110 (e.g., a voltage or signal detector connected to the output of transmitter 110 to detect when a signal is transmitted, and the like).

Any control means for temporarily suspending and for continuing noisy process(es) can be used. For example, process controller 105 can be used to temporarily suspend the noisy process(es) when the process controller 105 determines that the first set of information is to be transmitted, and to continue the noisy process(es) after the first set of information has been transmitted. For example, process controller 105 can command or otherwise instruct noisy process 115, associated with transmitter 110 noise, to temporarily suspend operation. For example, process controller 105 can send a blanking signal or any other type of instruction signal, message or command to noisy process 115 that instructs noisy process 115 to temporarily suspend or otherwise cease operation. Alternatively, process controller 105 can temporarily suspend noisy process 115 by temporarily disconnecting noisy process 115 from transmitter 110 using, for example, any type of electronic switch that can connect noisy process 115 to transmitter 110. However, any method for temporarily suspending the noisy processes, such as those associated with the transmitter 110, can be used.

According to an exemplary embodiment of the present invention, the at least one process associated with transmitter 110 noise can comprise a supply of power to the transmitter 110. Thus, the noisy process 115 can be, for example, a power supply 115 that supplies power to the transmitter 110. The power supply 115 of the transmitter 110 can then be temporarily suspended while the transmitter 110 transmits the first set of information. Accordingly, the transmitter 110 can transmit the first set of information, or any other signal or information, without interference from the associated power supply.

The system 100 can include means for storing energy to power the transmitter 110 when the supply of power to the transmitter 110 is temporarily suspended. For example, energy storage 112 can be one or more capacitors that store electrical charge supplied from the power supply 115. When the power supply 115 is temporarily suspended, the operating power for transmitter 110 can be supplied by, for example, the stored charge in the one or more capacitors of energy storage 112. However, energy storage 112 can be any means for storing energy that can be used to supply power to transmitter 110 when the power supply 115 is temporarily suspended, and that does not substantially produce interference or other noise that can affect the integrity of the first set of information.

Once the transmitter 110 has transmitted the first set of information, the noisy process 115 can be continued. The control means, such as process controller 105, can determine that the transmitter 110 has transmitted the first set of information. For example, process controller 105 can detect that there is no output signal from transmitter 110, transmitter 110 can supply any type of signal or message to process controller 105 informing process controller 105 that the first set of information has been transmitted, or process controller 105 can use a timer to gauge when the transmitter 110 transmits the first set of information. However, other methods for detecting when the transmitter 110 has transmitted the first set of information can be used.

To continue the noisy process 115 after it has been determined that the transmitter 110 has transmitted the first set of information, the control means can command or otherwise instruct noisy process 115 to continue operation. For example, process controller 105 can send an enable signal or any other type of instruction signal, message or command to noisy process 115 that instructs noisy process 115 to continue operation, such as by powering up or on. Alternatively, process controller 105 can continue noisy process 115 by connecting noisy process 115 to transmitter 110 using, for example, any type of electronic switch that can connect noisy process 115 to transmitter 110.

It should be noted that noisy process 115 or noisy process 120 or a combination of both noisy processes could negatively affect either the transmitter 110 or the receiver 125 or both. Thus, noisy process 115 or noisy process 120 or both of the noisy processes can be temporarily suspended during transmission by transmitter 110 and/or during reception by receiver 125. The process according to exemplary embodiments of temporarily suspending (controllable) noisy processes while information is being transmitted or received and then continuing those (controllable) noisy processes after the information has been transmitted or received can be repeated for subsequent sets of information.

According to an alternative exemplary embodiment, the receiver 125 does not need to collect the entire second set of information each time the second set is received. Rather, a subset of the total information actually received at system 100 can be collected by receiver 125 during the period of time that the noisy process(es), such as noisy process 120, is temporarily suspended. In other words, the receiver 125 can collect one or more different subsets of the second set of information each time receiver 125 receives the second set of information. The second set of information can be viewed as a collection of smaller subsets of information that, when concatenated or otherwise combined together, comprise the second set of information. By collecting different subsets of the second set of information each time the second set of information is received, the receiver 125 can work with smaller receive intervals on which to receive information.

The length of a subset of the second set of information can be controlled by, for example, the process controller 105. For example, the process controller 105 can control the receiver 125 to receive only a particular subset or fraction of the second set of information by activating the receiver 125 for a shorter period of time that corresponds to the length of the subset of information. Using smaller receive intervals, the noisy process(es) associated with receiver noise can be turned off either for the entire duration of the second set of information, for the duration of the subset of the second set of information, or for any length of time in between. Each of the collected subsets can be stored in, for example, memory 106 of process controller 105 or any other memory associated with system 100. Once all of the subsets of the second set of information have been collected, all of the subsets can be retrieved from memory and concatenated together or otherwise combined to form the second set of information.

Thus, according to the present alternative exemplary embodiment, the receiver 125 can receive at least one of a plurality of subsets of information. The plurality of subsets of information can comprise the second set of information. The received plurality of subsets of information can be concatenated together or otherwise combined to form the second set of information.

According to exemplary embodiments, controllable noise sources, such as the noisy processes 115 and 120 associated with either or both of transmitter 110 noise and receiver 125 noise can be temporarily suspended while the transmitter 110 transmits the first set of information and/or the receiver 125 receives the second set of information to remove the interference contributed by these controllable noisy processes that would otherwise effect the integrity of the signal transmitted by transmitter 110 and/or received by receiver 125. The noisy processes can then be continued after the information has been transmitted and/or received. If data samples are taken essentially continuously (i.e., each individual sample is taken at an invariant interval), and if the transient response time of, for example, the receiver 125 is considerably shorter than the interval between samples, interfering processes can be allowed to operate briefly immediately after any particular receiver data sample is taken and subsequently suspended or otherwise interrupted, allowing adequate time prior to the next sample time during which, for example, the receiver response to the undesired momentary interference can decay to an insignificant amount.

For uncontrollable noise sources (i.e., noise that is unrelated to the transmitter and/or receiver), however, the source of the noise may not necessarily be resident within system 100, but may be external to system 100. If this noise is comprised of transient bursts of noise that occur at regular intervals, the receiver 125 can be synchronized to the periodicity of the noise energy, such that the second set of information can be received between the regular bursts of the transient noise. Additionally, the transmitter 110 can be synchronized to the periodicity of the uncontrollable noise, such that the first set of information can be transmitted between the bursts of the uncontrollable noise.

According to an exemplary embodiment, the periodicity of the uncontrollable noise may be known a priori. If the periodicity is known beforehand, the receiver 125 can receive the second set of information between peak intervals in noise of at least one other process, where the peaks in the noise of the at least one other process occur at determined intervals. The at least one other process is a process that is not associated with either the transmitter 110 or receiver 125. In other words, the at least one other process can be an uncontrollable noisy process, for example, that is created or caused externally to system 100. Since the periodicity of the uncontrollable noisy process is known a priori, the periodicity can be stored in, for example, the memory 106 of process controller 105, or any other memory or electronic storage medium associated with the system 100. Process controller 105 can then control the transmitter 110 and receiver 125 to shift the time window in which to transmit the first set of information and receive the second set of information, respectively, to coincide with the interval between the peaks in the uncontrollable noise. If the interval between peaks in the uncontrollable noise is shorter than the time it takes to receive the entire second set of information, the receiver 125 can collect subsets of the second set of information, as discussed previously, and concatenate together the collected subsets once all of the subsets that comprise the second set of information are collected.

According to an alternative exemplary embodiment, the peaks in the uncontrollable noise can occur at regular intervals, but the periodicity of the uncontrollable noise may not be known a priori. If not known beforehand, the periodicity can be dynamically determined by system 100. According to the present alternative exemplary embodiment, the system 100 can include means for determining peak intervals in noise of at least one other process, where the peaks in the noise of the at least one other process occur at determined intervals. The at least one other process is a process that is not associated with either the transmitter 110 or receiver 125. For example, the at least one other process can be an uncontrollable noisy process that is created or caused externally to system 100. The peak interval determining means can include any means for determining peaks in a signal. Peak detection and peak detectors are described in, for example, U.S. Pat. Nos. 6,535,027, 6,472,861, 6,342,849, 5,324,994, and 5,987,392. However, any means for determining peaks in a signal can be used. Once the intervals of the peak noise signal are detected, the periodicity of those peaks (i.e., the time interval between those peaks) can be determined from, for example, the time difference between the peak detections. The time difference, and corresponding periodicity, calculation can be performed by, for example, process controller 105. The periodicity of the transient noise signal can then be stored in, for example, memory 106 of process controller 105, or any other memory or electronic storage medium associated with system 100.

Once the peaks in the noise have been detected and the periodicity of the transient noise signal determined, process controller 105 can then control the transmitter 110 and receiver 125 to shift the time window in which to transmit the first set of information and receive the second set of information, respectively, to coincide with the interval between the peaks in the uncontrollable noise. Thus, the transmitter 100 can transmit the first set of information at a determined time such that the second set of information-is received by the receiver 125 between the peak intervals in the noise of the at least one other process. If the interval between peaks in the burst periodic noise is shorter than the time it takes to receive the entire second set of information, the receiver 125 can collect subsets of the second set of information, as discussed previously, and the collected subsets can be concatenated together once all of the subsets that comprise the second set of information are collected.

According to exemplary embodiments, the process for mitigating noise by shifting, for example, the receive window to coincide with the interval between peaks in the uncontrollable noise can be used in addition to or alternatively to the process for mitigating controllable noise in which the noisy process is temporarily suspended during information transmission and/or reception and continued after the information has been transmitted and/or received. Thus, exemplary embodiments of the present invention provide techniques for mitigating either or both controllable and uncontrollable burst periodic noise associated with information communication.

The system 100 can include other processes 135 associated with the receiver 125 and other processes 137 associated with the transmitter 110. For example, according to exemplary embodiments, the system 100 can include means for processing information associated with the transmitter 110 and/or receiver 125. Any means for processing information can be used to process information associated with the transmitter 110 and/or receiver 125. For example, the other processes 135 and 137 can be processors. The processors can be any type of processor, such as, for example, any type of microprocessor, microcontroller, DSP, ASIC, PROM, EPROM, EEPROM, or the like. However, the means for processing can be implemented using any combination of hardware, software, and/or firmware.

The system 100 can also include means for storing the information associated with at least one of the transmitter 110 and the receiver 125. For example, the other processes 135 and 137 can include a memory 136 and 138, respectively, that can be any type of computer memory or any other type of electronic storage medium that is located either internally or externally to other processes 135 and 137, such as, for example, ROM, RAM, cache memory, CDROM, electro-optical memory, magneto-optical memory, or the like. Although, for purpose of illustration and not limitation, the other processes 135 and 137 are illustrated as being connected to receiver 125 and transmitter 110, respectively, the other processes 135 and 137 can also be connected to transmitter 110 and receiver 125, respectively, or any other component of system 100. In addition, the processing and/or storing means can be the process controller 105 and memory 106, or any other process and memory associated with system 100.

The processing means can process the second set of information after the second set of information has been received by the receiver 125. For example, the other processes 135 can reconstruct the sampled data signal received by receiver 125 after it has been collected or otherwise received by receiver 125 (e.g., concatenating together collected subsets of the second set of information), or perform any other desired type of processing on the second set of information. The other processes 137 can process the first set of information, such as, for example, processing stored signals, waveforms, or other information that can be retrieved by other processes 137 from memory 138 and transmitted by transmitter 110 as the first set of information. In addition, other processes 135 and 137 can perform any or all of the functions performed by process controller 105, either in conjunction with or alternatively to process controller 105. Other uses for other processes 135 and 137 are possible. For example, the information associated with at least one of the transmitter 110 and the receiver 125 can be retrieved from information storage (e.g., memory 106, memory 136, memory 138 or any other computer memory or electronic storage medium) while the at least one process associated with at least one of transmitter 110 noise and receiver 125 noise is temporarily suspended. For example, pre-computed signals or waveforms or other information stored in, for example, memory 136 and/or memory 138 can be retrieved by other processes 135 and 137, respectively, while noisy process 115 associated with transmitter 110 noise and/or noisy process 120 associated with receiver 125 noise is temporarily suspended. Alternatively, a direct memory access function can be used to retrieve or otherwise read the stored information from information storage. Thus, for example, retrieved, pre-computed signals, waveforms or other information can then be transmitted by transmitter 110 when noisy process 115 associated with transmitter 110 noise and/or noisy process 120 associated with receiver 125 noise is temporarily suspended.

The system 100 can be embodied, in whole or at least in part, on, for example, a circuit board. The electronic components that can comprise system 100 can be connected using any suitable type of connection capable of communicating information between the electronic components. Alternatively, the electronic components that can comprise system 100 can be distributed over any number of circuits boards, with electronic components connected across circuit boards using any suitable type of connection capable of communicating information between electronic components across circuit boards. Alternatively, the system 100 can be embodied, in whole or at least in part, in, for example, any type of PC, DSP, ASIC, PROM, EPROM, EEPROM, or the like. However, exemplary embodiments of the present invention can be implemented using any combination of hardware, software, and/or firmware.

According to an alternative exemplary embodiment, the system 100 of FIG. 1 for mitigating noise associated with information communication can include a transmitter 110 for transmitting a first set of information. The transmitter 110 can be any type of electronic component or device that is capable of transmitting information over a communications medium, such as communications medium 140. According to exemplary embodiments, the first set of information transmitted by transmitter 110 can be any type of signal or information that can be transmitted over the communications medium 140, where the communications medium 140 can be any type of communications medium over which information can be transmitted and received. A receiver 125 can receive a second set of information, where the second set of information can be received by the receiver 125 in response to the first set of information. According to exemplary embodiments, the receiver 125 can be any type of electronic component or device that is capable of receiving information over the communications medium 140. The second set of information received by receiver 125 can be any type of signal or information that can be received over the communications medium 140.

The system 100 can include means for determining when the first set of information is transmitted by the transmitter 110. Any means for determining when the first set of information is transmitted by the transmitter 110 can be used. For example, process controller 105 can be used to determine when the first set of information is transmitted by the transmitter 110.

The system 100 can also include control means for temporarily suspending at least one process when the determining means determines that the first set of information is being transmitted, and for continuing the at least one process after the first set of information has been transmitted by the transmitter 110. Any control means for temporarily suspending and for continuing noisy process(es) can be used. For example, process controller 105 can be used to temporarily suspend the noisy process(es), when the process controller 105 determines that the first set of information has been transmitted, and to continue the noisy process(es) after the first set of information has been transmitted. However, the control means can be implemented using any combination of hardware, software, and/or firmware.

The at least one process can produce noise that interferes with the integrity of the first set of information transmitted by the transmitter 110. According to an exemplary embodiment, the at least one process can be associated with transmitter 110 noise. For example, noisy process 115 associated with transmitter 110 noise can be any type of noisy process or processes that interferes with the integrity of the signal transmitted by the transmitter 110. The transmitter 110 can transmit the first set of information while the at least one process associated with transmitter 110 noise is temporarily suspended. In other words, the transmitter 110 can transmit the first set of information while processes not directly associated with the operation of the transmitter 110 are temporarily suspended. Thus, while the transmitter circuitry of transmitter 110 and the functions of the transmitter 110 used for transmitting information can be considered to be directly associated with the operation of the transmitter 110, processes such as noisy process 115 are not, and can be temporarily suspended while the transmitter 110 transmits the first set of information.

According to exemplary embodiments, process controller 105 can determine when transmitter 110 transmits the first set of information. Upon such a determination, process controller 105 can instruct switch 130 to switch from the transmission line 108 to the receiver line 127, although, alternatively, there can be a direct connection between the communications medium 140 and the transmission and receiver lines 108, 127, respectively. Also upon such a determination, process controller 105 can command or otherwise instruct noisy process 115 to temporarily suspend operation. For example, process controller 105 can send a blanking signal or any other type of instruction signal, message or command to noisy process 115 that instructs noisy process 115 to temporarily suspend or otherwise cease operation. Alternatively, process controller 105 can temporarily suspend noisy process 115 by temporarily disconnecting noisy process 115 from transmitter 110 using, for example, any type of electronic switch that can connect noisy process 115 to transmitter 110. However, any method for temporarily suspending the noisy processes associated with the transmitter 110 can be used.

According to an exemplary embodiment of the present invention, the at least one process associated with transmitter 110 noise can comprise a supply of power to the transmitter 110. Thus, the noisy process 115 can be, for example, a power supply 115 that supplies power to the transmitter 115. The power supply 115 of the transmitter 110 can be temporarily suspended while the transmitter 110 transmits the first set of information. Accordingly, the transmitter 110 can transmit the first set of information, or any other signal or information, without interference from the associated power supply 115. The system 100 can include means for storing energy to power the transmitter 110 when the supply of power to the transmitter 110 is temporarily suspended. For example, energy storage 112 can be one or more capacitors that store electrical charge supplied from the power supply 115. When the power supply 115 is temporarily suspended, the operating power for transmitter 110 can be supplied by, for example, the stored charge in the one or more capacitors of energy storage 112. However, energy storage 112 can be any means for storing energy that can be used to supply power to the transmitter 110 when the power supply 115 is temporarily suspended, that does not substantially produce interference or noise that can interfere with the integrity of the first set of information.

Once the transmitter 110 has transmitted the first set of information, the noisy process 115 can be continued. The control means, such as process controller 105, can determine that the transmitter 110 has transmitted the first set of information. For example, process controller 105 can detect that there is no output signal from transmitter 110, transmitter 110 can supply any type of signal or message to process controller 105 informing process controller 105 that the first set of information has been transmitted, or process controller 105 can use a timer to gauge when the transmitter 110 transmits the first set of information. However, other methods for detecting when the transmitter 110 has transmitted the first set of information can be used.

To continue the noisy process 115 after it has been determined that the transmitter 110 has transmitted the first set of information, the control means can command or otherwise instruct noisy process 115 to continue operation. For example, process controller 105 can send an enable signal or any other type of instruction signal, message or command to noisy process 115 that instructs noisy process 115 to continue operation, such as by powering up or on. Alternatively, process controller 105 can continue noisy process 115 by connecting noisy process 115 to transmitter 110 using, for example, any type of electronic switch that can connect noisy process 115 to transmitter 110. The process according to exemplary embodiments of temporarily suspending controllable noisy processes while information is being transmitted and then continuing those controllable noisy processes after the information has been transmitted can be repeated for subsequent sets of information.

According to exemplary embodiments, the at least one process can be associated with receiver 125 noise. Thus, additionally or alternatively, noisy processes associated with receiver 125 noise can be temporarily suspended while the receiver 125 receives the second set of information, or any other signal or information, and then continued after the information has been received. According to exemplary embodiments, the control means can temporarily suspend the at least one process associated with receiver 125 noise when the determining means determines that the first set of information is being transmitted, and can continue the at least one process associated with receiver 125 noise after the second set of information has been received by the receiver 125. Any control means for temporarily suspending and for continuing noisy process(es) associated with receiver 125 noise can be used. For example, process controller 105 can be used to temporarily suspend the noisy process(es) associated with receiver 125 noise when the process controller 105 determines that the first set of information is being transmitted, and to continue the noisy process(es) associated with receiver 125 noise after the second set of information has been received.

According to exemplary embodiments, the at least one process associated with receiver 125 noise can produce noise that interferes with the integrity of the second set of information received by the receiver 125. For example, noisy process 120 associated with receiver 125 noise can be any type of noisy process or processes that interferes with the integrity of the signal received by the receiver 125. According to exemplary embodiments, the receiver 125 can receive the second set of information while processes not directly associated with the operation of the receiver 125 are temporarily suspended.

As discussed previously, any means for determining when a first set of information is transmitted can be used. For example, the process controller 105 can be used to determine when a first set of information is transmitted by the transmitter 110. However, other methods can be used to detect when the first set of information is transmitted by transmitter 110.

According to an exemplary embodiment of the present invention, the at least one process associated with receiver 125 noise can comprise a supply of power to the receiver 125. Thus, the noisy process 120 can be, for example, a power supply 120 that supplies power to the receiver 125. The power supply 120 of the receiver 125 can be temporarily suspended while the receiver 125 receives the second set of information. Accordingly, the receiver 125 can receive the second set of information, or any other signal or information, without interference from the associated power supply 120. The system 100 can include means for storing energy to power the receiver 125 when the supply of power to the receiver 125 is temporarily suspended. For example, energy storage 122 can be one or more capacitors that store electrical charge supplied from the power supply 120. However, energy storage 112 can be any means for storing energy that can be used to supply power to receiver 125 when the power supply 120 is temporarily suspended, and that does not substantially produce interference or noise that can interfere with the integrity of the second set of information.

Once the receiver 125 has received the second set of information, the noisy process 120 can be continued. The control means, such as process controller 105, can determine that the receiver 125 has received the second set of information. For example, process controller 105 can detect that there is no longer an input signal to receiver 125, receiver 125 can supply any type of signal or message to process controller 105 informing process controller 105 that the second set of information has been transmitted, or process controller 105 can use a timer to gauge when the receiver 125 receives the second set of information. Other methods for detecting when the receiver 125 has received the second set of information can be used.

To continue the noisy process 120 after it has been determined that the receiver 125 has received the second set of information, the control means can command or otherwise instruct noisy process 120 to continue operation. For example, process controller 105 can send an enable signal or any other type of instruction signal, message or command to noisy process 120 that instructs noisy process 120 to continue operation, such as by powering up or on. Alternatively, process controller 105 can continue noisy process 120 by connecting noisy process 120 to receiver 125 using, for example, any type of electronic switch that can connect noisy process 120 to receiver 125. The process according to exemplary embodiments of temporarily suspending controllable noisy processes while information is being received and then continuing those controllable noisy processes after the information has been received can be repeated for subsequent sets of information.

According to an alternative exemplary embodiment, the receiver 125 does not need to collect the entire second set of information each time it is received. Rather, a subset of the total information actually received at system 100 can be collected by receiver 125 during the period of time that the noisy process(es), such as noisy process 120, is temporarily suspended. The length of a subset of the second set of information can be controlled, for example, by the process controller 105. Thus, according to the present alternative exemplary embodiment, the receiver 125 can receive at least one of a plurality of subsets of information. The plurality of subsets of information can comprise the second set of information. The received plurality of subsets of information can be concatenated together or otherwise combined to form the second set of information. For such an alternative exemplary embodiment, repeated trials of sending duplicate sets of the first set of information can be performed, until at least one complete set of the second set of information is received.

For uncontrollable noise, if the noise is comprised of bursts of transient noise that occur at regular intervals, the receiver 125 can be synchronized to the periodicity of the noise energy such that the second set of information can be received between the bursts of the transient noise. According to an exemplary embodiment, the periodicity of the uncontrollable noise may be known a priori. If the periodicity is known beforehand, the receiver 125 can receive the second set of information between peak intervals in noise of at least one other process, where the peaks in the noise of the at least one other process occur at determined intervals. The at least one other process is a process that is not associated with either the transmitter 110 or receiver 125. According to an alternative exemplary embodiment, the peaks in the uncontrollable noise occur at regular intervals, but the periodicity of the uncontrollable noise may not be known a priori. If not known beforehand, the periodicity can be dynamically determined by system 100. According to the alternative exemplary embodiment, the system 100 includes means for determining peak energy intervals in noise of at least one other process, where the peaks in the noise of the at least one other process occur at determined intervals.

According to exemplary embodiments, the process for mitigating uncontrollable burst periodic noise by shifting the receive and/or transmit windows to coincide with the interval between peak periods in the noise energy can be used in addition to or alternatively to the process for mitigating controllable noise in which the noisy process is temporarily suspended during information transmission and/or reception and continued after the information has been transmitted and/or received. Thus, exemplary embodiments of the present invention provide techniques for mitigating either or both controllable and burst periodic uncontrollable noise associated with information communication.

According to exemplary embodiments, the system 100 can include means for processing information associated with the transmitter 110 and/or receiver 125. Any means for processing information can be used to process information associated with the transmitter 110 and/or receiver 125. For example, other processes 135 and/or 137 can process such information, although such information processing can be performed by process controller 105 or any other process associated with system 100. The system 100 can also include means for storing the information associated with at least one of the transmitter 110 and the receiver 125. For example, other processes 135 and 137 can include a memory 136 and a memory 138, respectively, although such information storage can be performed by memory 106 or any other memory or electronic storage medium associated with system 100. The processing means can, for example, process the second set of information after the second set of information has been received by the receiver 125.

According to an alternative exemplary embodiment, a system 100 of FIG. 1 for mitigating noise associated with information communication can include means for determining when a set of information is communicated. Any means for determining when the set of information is communicated can be used. For example, process controller 105 can be used to determine when the set of information is communicated. The set of information can be can be any type of signal or information that can be communicated over a communications medium, such as communications medium 140.

The system 100 can also include control means for temporarily suspending at least one process when the determining means determines that the set of information is being communicated, and for continuing the at least one process after the set of information has been communicated. Any control means for temporarily suspending and for continuing noisy processes can be used. For example, process - controller 105 can be used to temporarily suspend the noisy process(es) when the process controller 105 determines that the set of information is to be communicated and to continue the noisy process(es) after the set of information has been communicated. However, the control means can be implemented using any combination of hardware, software, and/or firmware.

According to exemplary embodiments, the at least one process can produce noise that interferes with the integrity of the set of information. The at least one process can be any type of noisy process or processes that interferes with the integrity of the signal or information communicated by system 100. The set of information can be communicated while the at least one process is temporarily suspended. In other words, the set of information can be communicated while processes not directly associated with the information communication are temporarily suspended.

According to an exemplary embodiment, the set of information can include a first set of information for transmission by a transmitter. For example, transmitter 110 can transmit the first set of information. Additionally, the at least one process can be associated with transmitter 110 noise. According to the exemplary embodiment, the control means can temporarily suspend the at least one process associated with transmitter 110 noise when the determining means determines that the first set of information is being transmitted, and can continue the at least one process associated with transmitter 110 noise after the first set of information has been transmitted by the transmitter 110.

According to exemplary embodiments, the at least one process associated with transmitter 110 noise produces noise that interferes with the integrity of the first set of information transmitted by the transmitter 110. The transmitter 110 can transmit the first set of information while the at least one process associated with transmitter 110 noise is temporarily suspended.

Once the transmitter 110 has transmitted the first set of information, the noisy process 115 can be continued. The control means, such as process controller 105, can determine that the transmitter 110 has transmitted the first set of information. However, other methods for detecting when the transmitter 110 has transmitted the first set of information can be used.

According to an exemplary embodiment of the present invention, the at least one process associated with transmitter 110 noise can comprise a supply of power to the transmitter 110. Thus, the transmitter 110 can transmit the first set of information, or any other signal or information, without interference from the associated power supply. The system 100 can include means for storing energy to power the transmitter 110 when the supply of power to the transmitter 110 is temporarily suspended. For example, energy storage 112 can be any means for storing energy that can be used to supply power to the transmitter 110 when the power supply 115 is temporarily suspended, and that does not substantially produce interference that can interfere with the integrity of the first set of information.

According to an exemplary embodiment, the set of information can include a first set of information and a second set of information. The second set of information can be received by a receiver, such as, for example, receiver 125, in response to transmission of the first set of information. Additionally, the at least one process can be associated with receiver 125 noise. According to the present exemplary embodiment, the control means can temporarily suspend the at least one process associated with receiver 125 noise when the determining means determines that the first set of information is being transmitted, and can continue the at least one process associated with receiver 125 noise after the second set of information has been received by the receiver 125.

According to exemplary embodiments, the at least one process associated with receiver 125 noise can produce noise that interferes with the integrity of the second set of information received by the receiver 125. The receiver 125 can receive the second set of information while the at least one process associated with receiver 125 noise is temporarily suspended.

Once the receiver 125 has received the second set of information, the noisy process 120 can be continued. The control means, such as process controller 105, can determine that the receiver 125 has received the second set of information. However, other methods for determining when the receiver 125 has received the second set of information can be used.

According to an exemplary embodiment of the present invention, the at least one process associated with receiver 125 noise can comprise a supply of power to the receiver 125. Thus, the receiver 125 can receive the second set of information, or any other signal or information, without interference from the associated power supply. The system 100 can include means for storing energy to power the receiver 125 when the supply of power to the receiver 125 is temporarily suspended. For example, energy storage 122 can be any means for storing energy that can be used to supply power to the receiver 125 when the power supply 120 is temporarily suspended, and that does not substantially produce interference that can interfere with the integrity of the second set of information.

Figure 2A:
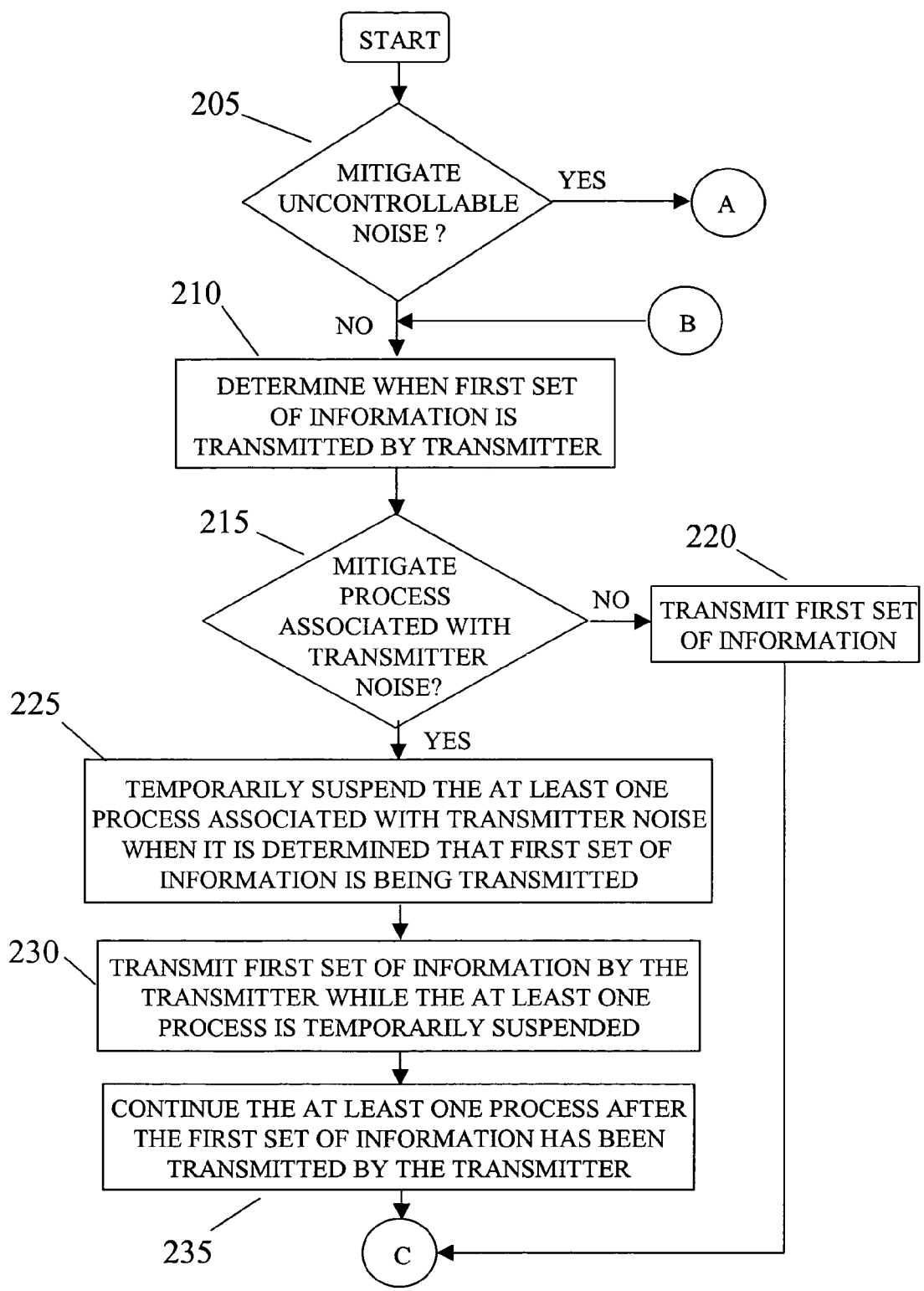
FIGS. 2A, 2B and 2C are flowcharts illustrating steps for mitigating noise associated with information communication, in accordance with an exemplary embodiment of the present invention.
Figure 2B:
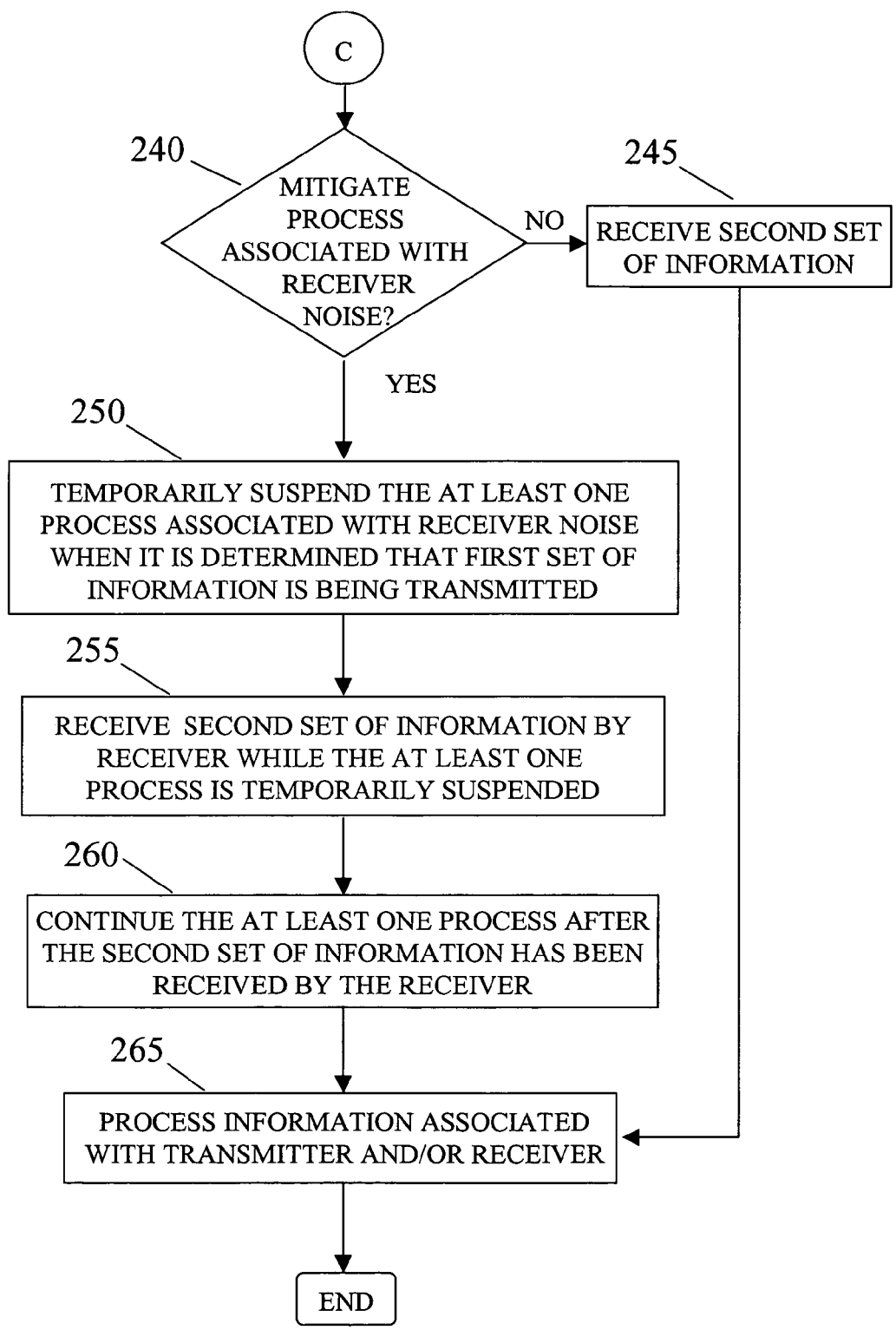
Figure 2C:
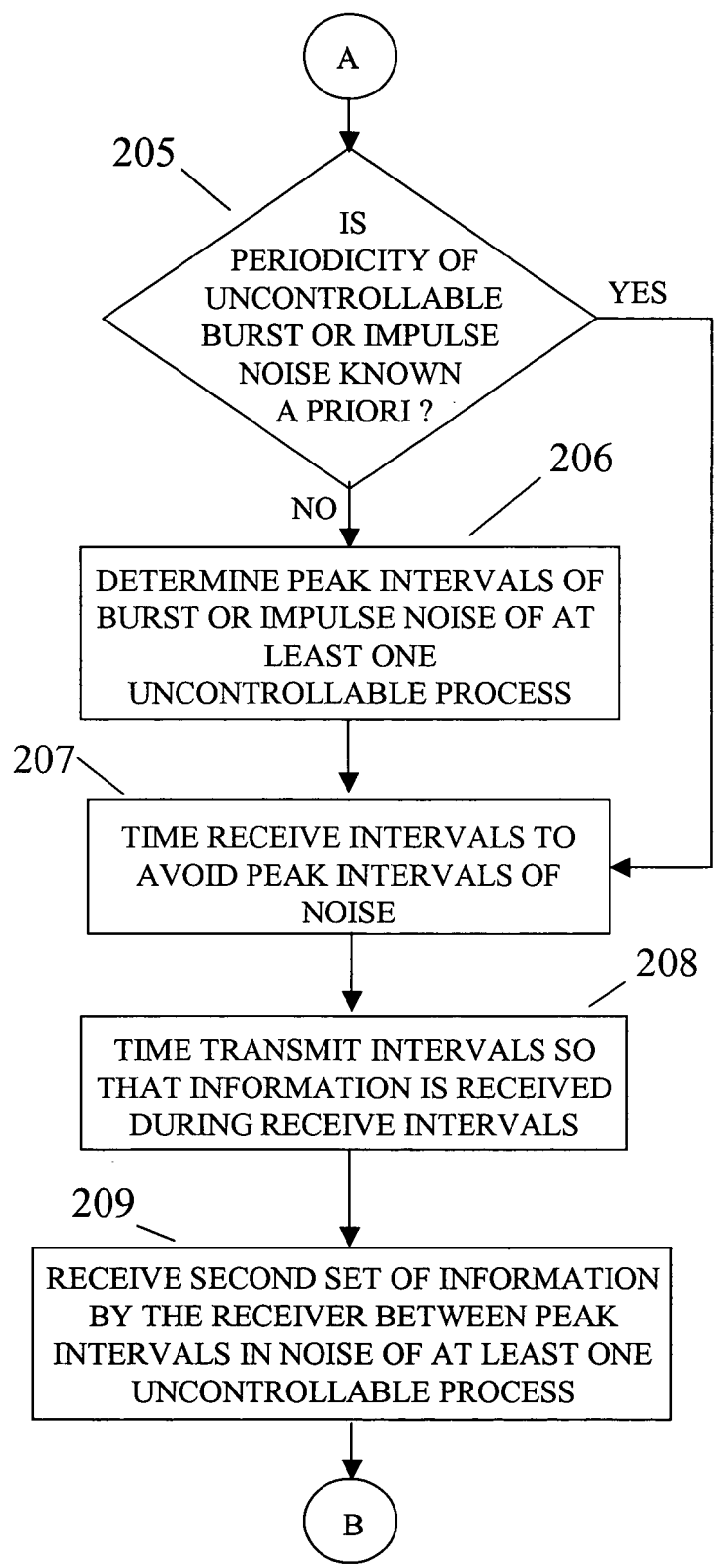

FIGS. 2A, 2B and 2C are flowcharts illustrating steps for mitigating noise associated with information communication, in accordance with exemplary embodiments. Exemplary embodiments of the present invention provide techniques for mitigating either or both controllable and uncontrollable noise associated with information communication. In FIG. 2A, if it is determined in step 203 that uncontrollable noise is not to be mitigated, then in step 210, a determination can be made of when a first set of information is transmitted by a transmitter. A second set of information can be received by a receiver in response to the first set of information. According to exemplary embodiments, at least one process associated with both or either transmitter noise and receiver noise can be mitigated. If it is determined in step 215 that the at least one process associated with transmitter noise is to be mitigated, then in step 225, the at least one process associated with transmitter noise can be temporarily suspended when it is determined that the first set of information is being transmitted.

According to exemplary embodiments, the at least one process associated with transmitter noise can produce noise that interferes with an integrity of the first set of information transmitted by the transmitter. For example, the at least one process associated with transmitter noise can comprise a supply of power to the transmitter, although the at least one process can be any noisy process that can interfere with the integrity of the first set of information. If the at least one process associated with transmitter noise is a power supply to the transmitter, then, for example, energy can be stored to power the transmitter when the supply of power to the transmitter is temporarily suspended.

In step 230, the first set of information can be transmitted by the transmitter while the at least one process associated with transmitter noise is temporarily suspended. In step 235, the at least one process associated with transmitter noise can be continued after the first set of information has been transmitted by the transmitter. However, if it is determined in step 215 that the at least one process associated with transmitter noise is not to be mitigated, then in step 220, the transmitter can transmit the first set of information without noise mitigation. In either case, the process can continue in FIG. 2B.

In step 240 of FIG. 2B, if it is determined that at least one process associated with receiver noise is to be mitigated, then in step 250, the at least one X process associated with receiver noise can be temporarily suspended when it is determined that the first set of information is being transmitted. According to exemplary embodiments, the at least one process associated with receiver noise can produce noise that interferes with the integrity of the second set of information received by the receiver. For example, the at least one process associated with receiver noise can comprise a supply of power to the transmitter, although the at least one process can be any noisy process that can interfere with the integrity of the second set of information. If the at least one process associated with receiver noise is a power supply to the receiver, then, for example, energy can be stored to power the receiver when the supply of power to the receiver is temporarily suspended.

In step 255, the second set of information can be received by the receiver while the at least one process associated with receiver noise is temporarily suspended. In step 260, the at least one process associated with receiver noise can be continued after the second set of information has been received by the receiver. However, if it is determined in step 240 that the at least one process associated with receiver noise is not to be mitigated, then in step 245, the receiver can receive the second set of information without noise mitigation. In either case, in step 265, information associated with the transmitter and/or receiver can be processed.

In step 203, a determination can be made whether uncontrollable noise is to be mitigated according to exemplary embodiments of the present invention. If it is determined in step 203 that uncontrollable noise is to be mitigated, then in step 205 of FIG. 2C, a determination can be made whether the periodicity of the uncontrollable noise (e.g., burst or impulse noise) is known a priori. If the periodicity is not known beforehand, then in step 206, peak intervals in noise of at least one (uncontrollable) process can be determined (e.g., future peak intervals of burst or impulse noise can be predicted). The peak intervals in the uncontrollable noise can be determined, for example, according to exemplary embodiments discussed previously. The at least one other process is not associated with the either the transmitter or the receiver. In other words, the at least one other process can be uncontrollable noise, in which the peaks in the uncontrollable noise occur at determined intervals. Whether or not the periodicity of the uncontrollable noise is known a priori, in step 207, the receive intervals for receiving the second set of information can be timed or otherwise established to avoid peak intervals of noise. In step 208, the transmit intervals for transmitting the first set of information can be timed or otherwise established so that the second set of information can be received during the receive intervals. If the periodicity of the uncontrollable noise is known a priori, then in step 209, the second set of information can be received by the receiver between peak intervals in noise of the at least one (uncontrollable) process. Alternatively, the periodicity of the uncontrollable noise may not be known beforehand. If not, then the periodicity of the uncontrollable noise was previously determined in step 206 of FIG. 2C. Consequently, using the determined periodicity, step 209 can be performed to receive the second set of information by the receiver between the determined peak intervals in the noise of the at least one other (uncontrollable) process. The process can then continue at step 210 of FIG. 2A.

Figure 3:
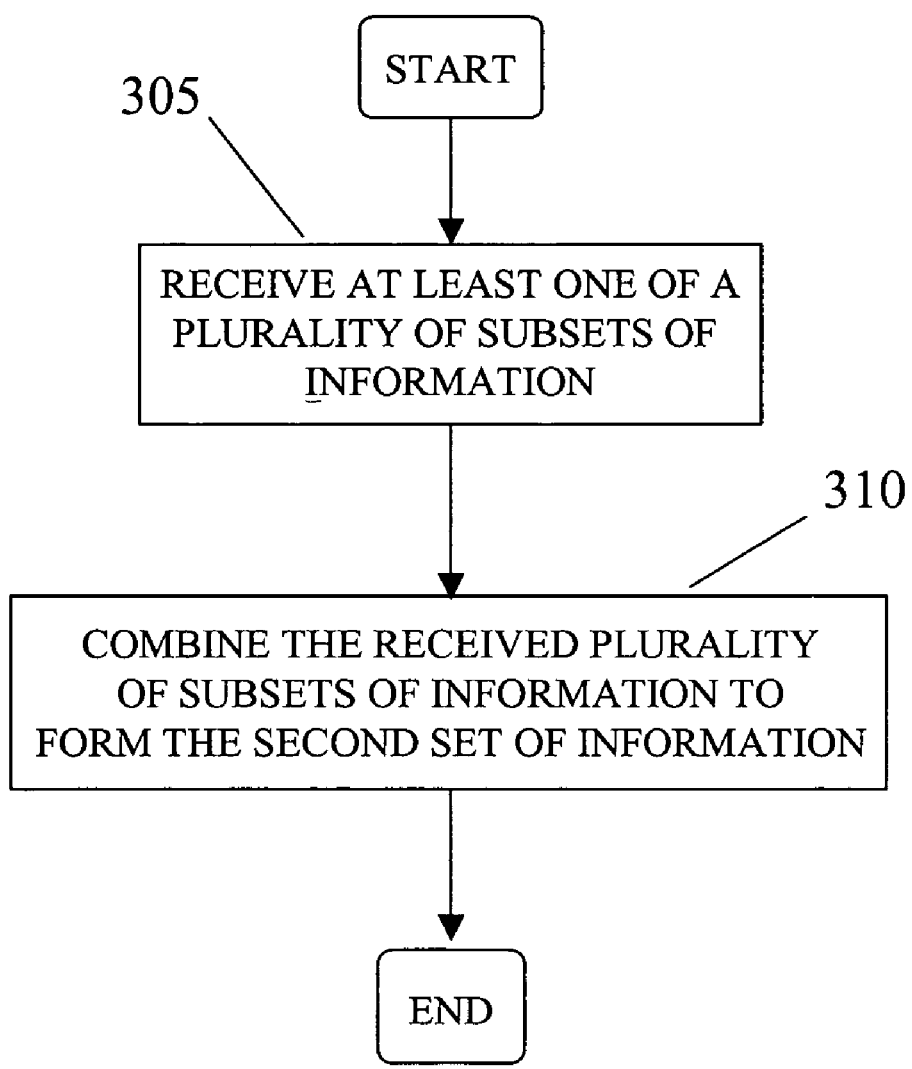
FIG. 3 is a flowchart illustrating steps for receiving at least one of a plurality of subsets of information and combining the received plurality of subsets of information to form a second set of information, in accordance with an exemplary embodiment of the present invention.

FIG. 3 is a flowchart illustrating steps for receiving a second set of information by a receiver while at least one process associated with receiver noise is temporarily suspended, in accordance with an exemplary embodiment of the present invention. As discussed previously, according to an alternative exemplary embodiment, the receiver does not need to collect the entire second set of information each time the second set is received. Rather, the receiver can collect one or more different subsets of the second set of information each time the receiver receives the second set of information. Thus, in step 305, at least one of a plurality of subsets of information can be received. The plurality of subsets of information can comprise the second set of information. Once all of the subsets of information that can comprise the second set of information have been collected, in step 310, the received plurality of subsets of information can be combined or otherwise concatenated together to form the second set of information.

Figure 4:
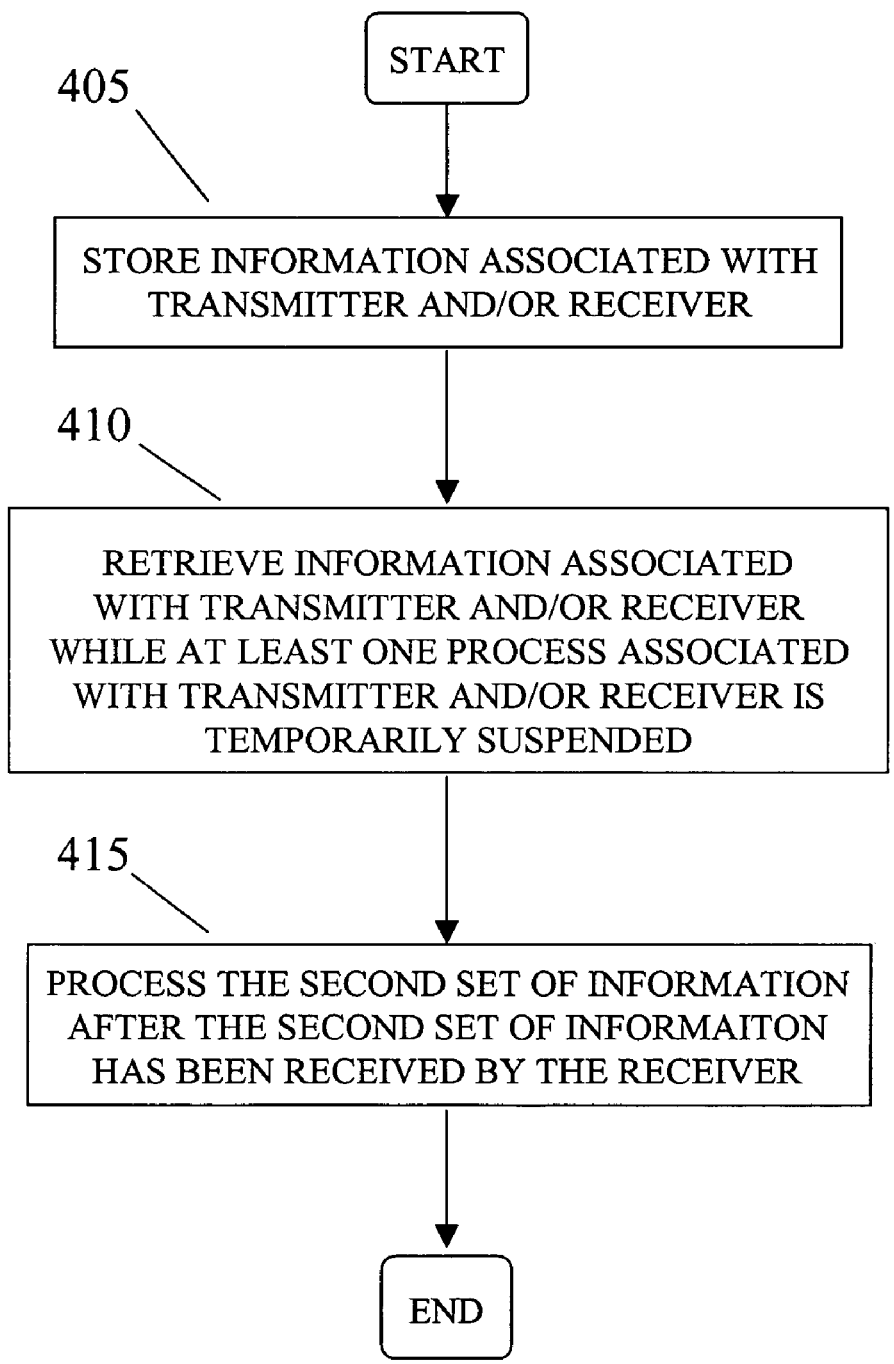
FIG. 4 is a flowchart illustrating steps for processing information associated with at least one of a transmitter and a receiver, in accordance with an exemplary embodiment of the present invention.

FIG. 4 is a flowchart illustrating steps for processing information associated with a transmitter and/or a receiver, in accordance with an exemplary embodiment of the present invention. In step 405, any type of information associated with the transmitter and/or the receiver can be stored. For example, the first and/or second sets of information, pre-computed signals, waveforms, or any other type of information associated with the transmitter and/or receiver can be stored, for example, in any-type of computer memory or other electronic storage medium. In step 410, the information associated with the transmitter and/or receiver can be retrieved from information storage while the at least one process associated with transmitter noise and/or receiver noise is temporarily suspended. In step 415, the second set of information can be processed after the second set of information has been received by the receiver, although any of the retrieved information can also be processed.

The steps of a computer program as illustrated in FIGS. 2A, 2B, 2C, 3 and 4 for mitigating noise associated with information communication can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a RAM, a ROM, an EPROM or Flash memory, an optical fiber, and a portable CDROM.

Exemplary embodiments of the present invention can be used in any type of information communication system where noisy processes not directly associated, with the operation of the information communication system (both controllable and uncontrollable) can be temporarily suspended or otherwise interrupted during the actual transmission and/or reception of data, regardless of the medium over or through which the information is communicated. For example, exemplary embodiments can be used in stimulus-response systems, such as, for example, time domain reflectometers (both electrical and optical), and other sampled data systems and the like, including, but not limited to, ultrasound systems, magnetic resonance imaging systems, and the like. In addition, exemplary embodiments can be used in any circuit board configuration in which electronic components included within the circuit board transmit and receive sampled data, and in which either or both of controllable and uncontrollable noise sources can effect the integrity of the signals transmitted and/or received by the system. Thus, exemplary embodiments of the present invention can be used in a wide variety of fields, such as, for example, telecommunications, medical, mechanical, and the like.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for mitigating noise associated with information communication, comprising:
   a determining unit configured to determine when a first set of information is transmitted by a transmitter;
   a receiver for receiving a second set of information in response to the first set of information;
   a control unit configured to temporarily suspend at least one process when the determining unit determines that the first set of information is being transmitted and for continuing the at least one process after the second set of information has been received by the receiver; and
   a storing unit configured to store energy to power the receiver when the supply of power to the receiver is temporarily suspended,
   wherein the at least one process produces noise that interferes with an integrity of the second set of information received by the receiver,
   wherein the at least one process is associated with receiver noise,
   wherein the receiver receives the second set of information while the at least one process associated with receiver noise is temporarily suspended, and
   wherein the at least one process associated with receiver noise comprises a supply of power to the receiver.

2. The system of claim 1, wherein the transmitter transmits the first set of information.

3. A system for mitigating noise associated with information communication, comprising:
   a determining unit configured to determine when a first set of information is transmitted by a transmitter;
   a receiver for receiving a second set of information in response to the first set of information; and
   a control unit configured to temporarily suspend at least one process when the determining unit determines that the first set of information is being transmitted and for continuing the at least one process after the second set of information has been received by the receiver,
   wherein the at least one process produces noise that interferes with an integrity of the second set of information received by the receiver,
   wherein the at least one process is associated with transmitter noise,
   wherein the control means temporarily suspends the at least one process associated with transmitter noise when the determining means determines that the first set of information is to be transmitted and continues the at least one process associated with transmitter noise after the first set of information has been transmitted by the transmitter, wherein the at least one process associated with transmitter noise produces noise that interferes with an integrity of the first set of information transmitted by the transmitter.

4. The system of claim 3, wherein the transmitter transmits the first set of information while the at least one process associated with transmitter noise is temporarily suspended.

5. The system of claim 3, wherein the at least one process associated with transmitter noise comprises a supply of power to the transmitter.

6. The system of claim 5, comprising:
a storing unit configured to store energy to power the transmitter when the supply of power to the transmitter is temporarily suspended.

7. The system of claim 3, wherein the receiver receives at least one of a plurality of subsets of information, wherein the plurality of subsets of information comprise the second set of information, and wherein the received plurality of subsets of information are combined to form the, second set of information.

8. The system of claim 3, comprising:
a processing unit configured to process information associated with at least one of the transmitter and the receiver.

9. The system of claim 8, wherein the processing unit processes the second set of information after the second set of information has been received by the receiver.

10. The system of claim 8, comprising
a storing unit configured to store the information associated with at least one of the transmitter and the receiver.

11. The system of claim 10, wherein the information associated with at least one of the transmitter and the receiver is retrieved from the means for storing information while at least one process associated with at least one of transmitter noise and receiver noise is temporarily suspended.

12. A system for mitigating noise associated with information communication, comprising:
a determining unit configured to determine when a first set of information is transmitted by a transmitter;
a receiver for receiving a second set of information in response to the first set of information; and
a control unit configured to temporarily suspend at least one process when the determining unit determines that the first set of information is being transmitted and for continuing the at least one process after the second set of information has been received by the receiver,
wherein the at least one process produces noise that interferes with an integrity of the second set of information received by the receiver, and
wherein the receiver receives the second set of information between peak intervals in noise of at least one other process, wherein the at least one other process has an absence of association with the receiver, and wherein peaks in the noise of the at least one other process occur at determined intervals.

13. A system for mitigating noise associated with information communication, comprising:
a first determining unit configured to determine when a first set of information is transmitted by a transmitter;
a receiver for receiving a second set of information in response to the first set of information;
a control unit configured to temporarily suspend at least one process when the first determining unit determines that the first set of information is being transmitted and for continuing the at least one process after the second set of information has been received by the receiver; and
a second determining unit configured to determine peak intervals in noise of at least one other process,
wherein the at least one process produces noise that interferes with an integrity of the second set of information received by the receiver,
wherein the at least one other process has an absence of association with at least one of the transmitter and the receiver,
wherein peaks in the noise of the at least one other process occur at determined intervals, and
wherein the receiver receives the second set of information between the peak intervals in the noise of the at least one other process.

14. The system of claim 13, wherein the transmitter transmits the first set of information at a determined time such that the second set of information is received by the receiver between the peak intervals in the noise of the at least one other process.

15. A method of mitigating noise associated with information communication, comprising the steps of:
determining when a first set of information is transmitted by a transmitter,
wherein a second set of information is received by a receiver in response to the first set of information;
temporarily suspending at least one process when it is determined that the first set of information is being transmitted,
wherein the at least one process is associated with receiver noise,
wherein the at least one process produces noise that interferes with an integrity of the second set of information received by the receiver,
the method further comprising the steps of:
continuing the at least one process after the second set of information has been received by the receiver;
storing energy to power the receiver when the supply of power to the receiver is temporarily suspended; and
receiving the second set of information by the receiver while the at least one process associated with receiver noise is temporarily suspended,
wherein the at least one process associated with receiver noise comprises a supply of power to the receiver.

16. The method of claim 15, comprising the step of:
transmitting the first set of information by the transmitter.

17. A method of mitigating noise associated with information communication, comprising the steps of:
determining when a first set of information is transmitted by a transmitter,
wherein a second set of information is received by a receiver in response to the first set of information;
temporarily suspending at least one process when it is determined that the first set of information is being transmitted,
wherein the at least one process produces noise that interferes with an integrity of the second set of information received by the receiver; and
continuing the at least one process after the second set of information has been received by the receiver;

wherein the at least one process is associated with transmitter noise, and wherein the method comprises the steps of:
temporarily suspending the at least one process associated with transmitter noise when it is determined that the first set of information is to be transmitted,
wherein the at least one process associated with transmitter noise produces noise that interferes with an integrity of the first set of information transmitter by the transmitter; and
continuing the at least one process associated with transmitter noise after the first set of information has been transmitted by the transmitter.

18. The method of claim 17, comprising the step of:
transmitting the first set of information by the transmitter while the at least one process associated with transmitter noise is temporarily suspended.

19. The method of claim 17, wherein the at least one process associated with transmitter noise comprises a supply of power to the transmitter.

20. The method of claim 19, comprising the step of:
storing energy to power the transmitter when the supply of power to the transmitter is temporarily suspended.

21. The method of claim 17, comprising the steps of:
receiving at least one of a plurality of subsets of information,
wherein the plurality of subsets of information comprise the second set of information; and
combining the received plurality of subsets of information to form the second set of information.

22. A method of mitigating noise associated with information communication, comprising the steps of:
determining when a first set of information is transmitted by a transmitter,
wherein a second set of information is received by a receiver in response to the first set of information;
temporarily suspending at least one process when it is determined that the first set of information is being transmitted,
wherein the at least one process produces noise that interferes with an integrity of the second set of information received by the receiver;
continuing the at least one process after the second set of information has been received by the receiver; and
receiving the second set of information by the receiver between peak intervals in noise of at least one other process,
wherein the at least one other process has an absence of association with at least one of the transmitter and the receiver, and
wherein peaks in the noise of the at least one other process occur at determined intervals.

23. The method of claim 22, comprising the step of:
processing information associated with at least one of the transmitter and the receiver.

24. The method of claim 23, comprising the step of:
processing the second set of information after the second set of information has been received by the receiver.

25. The method of claim 23, comprising the step of:
storing the information associated with at least one of the transmitter and the receiver.

26. The method of claim 25, comprising the step of:
retrieving from information storage the information associated with at least one of the transmitter and the receiver while at least one process associated with at least one of transmitter noise and receiver noise is temporarily suspended.

27. A method of mitigating noise associated with information communication, comprising the steps of:
determining when a first set of information is transmitted by a transmitter,
wherein a second set of information is received by a receiver in response to the first set of information;
temporarily suspending at least one process when it is determined that the first set of information is being transmitted,
wherein the at least one process produces noise that interferes with an integrity of the second set of information received by the receiver;
continuing the at least one process after the second set of information has been received by the receiver; and
determining peak intervals in noise of at least one other process,
wherein the at least one other process has an absence of association with the receiver,
wherein peaks in the noise of the at least one other process occur at determined intervals; and
receiving the second set of information by the receiver between the peak intervals in the noise of the at least one other process.

28. The method of claim 27, wherein the transmitter transmits the first set of information at a determined time such that the second set of information is received by the receiver between the peak intervals in the noise of the at least one other process.

29. A system for mitigating noise associated with information communication, comprising:
a determining unit configured to determine when a set of information is communicated;
a control unit configured to temporarily suspend at least one process when the determining means determines that the set of information is being communicated, and for continuing the at least one process after the set of information has been communicated,
wherein the at least one process produces noise that interferes with an integrity of the set of information,
wherein the set of information is communicated while the at least one process is temporarily suspended,
wherein the set of information includes a first set of information for transmission by a transmitter,
wherein the at least one process is associated with transmitter noise, wherein the control unit temporarily suspends the at least one process associated with transmitter noise when the determining unit determines that the first set of information is to be transmitted and continues the at least one process associated with transmitter noise after the first set of information has been transmitted by the transmitter, and
wherein the at least one process associated with transmitter noise produces noise that interferes with an integrity of the first set of information transmitted by the transmitter.

30. The system of claim 29, wherein the set of information includes a first set of information and a second set of information,
wherein the second set of information is received by a receiver in response to transmission of the first set of information,
wherein the at least one process is associated with receiver noise, wherein the control unit temporarily suspends the at least one process associated with receiver noise when the determining means determines that the first set of information is being transmitted and continues the at least one process associated with receiver noise after the second set of information has been received by the receiver, wherein the at least one process associated with receiver noise produces noise that interferes with an integrity of the second set of information received by the receiver.

31. A method for mitigating noise associated with information communication, comprising the steps of:

determining when a set of information is communicated;

temporarily suspending at least one process when it is determined that the set of information is being communicated, wherein the at least one process produces noise that interferes with an integrity of the set of information;

communicating the set of information while the at least one process is temporarily suspended; and continuing the at least one process after the set of information has been communicated, wherein the set of information includes a first set of information for transmission by a transmitter, wherein the at least one process is associated with transmitter noise, and wherein the method comprises the steps of:

temporarily suspending the at least one process associated with transmitter noise when it is determined that the first set of information is to be transmitted, wherein the at least one process associated with transmitter noise produces noise that interferes with an integrity of the first set of information transmitted by the transmitter; and continuing the at least one process associated with transmitter noise after the first set of information has been transmitted by the transmitter.

32. The method of claim 31, wherein the set of information includes a first set of information and a second set of information, wherein the second set of information is received by a receiver in response to transmission of the first set of information, wherein the at least one process is associated with receiver noise, and wherein the method comprises the steps of:

temporarily suspending the at least one process associated with receiver noise when it is determined that the first set of information is being transmitted, wherein the at least one process associated with receiver noise produces noise that interferes with an integrity of the second set of information received by the receiver; and continuing the at least one process associated with receiver noise after the second set of information has been received by the receiver.

* * * * *